(12) United States Patent
Hirano et al.

(10) Patent No.: US 12,577,703 B2
(45) Date of Patent: Mar. 17, 2026

(54) MELT SPINNING RESIN COMPOSITION, MANUFACTURING METHOD FOR SAME, AND FIBER MANUFACTURING METHOD

(71) Applicant: Kao Corporation, Tokyo (JP)

(72) Inventors: Takahiro Hirano, Utsunomiya (JP);
Hideo Kobayashi, Moka (JP);
Takehiko Uematsu, Oyama (JP);
Shohei Natsui, Utsunomiya (JP)

(73) Assignee: Kao Corporation, Tokyo (JP)

( * ) Notice: Subject to any disclaimer, the term of this patent is extended or adjusted under 35 U.S.C. 154(b) by 178 days.

(21) Appl. No.: 18/535,350

(22) Filed: Dec. 11, 2023

(65) Prior Publication Data

US 2024/0133078 A1 Apr. 25, 2024

Related U.S. Application Data

(62) Division of application No. 17/632,084, filed as application No. PCT/JP2020/041508 on Nov. 6, 2020, now abandoned.

(30) Foreign Application Priority Data

Dec. 2, 2019 (JP) ................................. 2019-218117
Dec. 2, 2019 (JP) ................................. 2019-218118

(51) Int. Cl.
*B29B 13/00* (2006.01)
*B29C 31/04* (2006.01)
(Continued)

(52) U.S. Cl.
CPC ............. *D01D 5/0023* (2013.01); *D01D 1/06* (2013.01); *D01F 6/06* (2013.01); *D01F 6/625* (2013.01);
(Continued)

(58) Field of Classification Search
CPC ......... B29B 13/00; B29C 31/04; B29C 31/08; B29C 64/118; B29C 71/02; B29C 64/209;
(Continued)

(56) References Cited

U.S. PATENT DOCUMENTS 6,218,011 B1 4/2001 Raetzsch et al.
6,537,473 B2 3/2003 Raetzsch et al.
(Continued)

FOREIGN PATENT DOCUMENTS

CN 102459724 A 5/2012
CN 105709512 A 6/2016
(Continued)

OTHER PUBLICATIONS

Translation of CN 109666272 A (published on Apr. 23, 2019).*
(Continued)

*Primary Examiner* — Leo B Tentoni
(74) *Attorney, Agent, or Firm* — Oblon, McClelland, Maier & Neustadt, L.L.P.

(57) ABSTRACT

The resin composition for melt spinning of the present invention is a filament having a melt viscosity of 250 Pa·s or less at 200° C. and a shear rate of 0.1 s$^{-1}$ and a tensile strength of 10 MPa or more. The filament can be produced by forming a molten liquid of a resin composition having a melt viscosity of 250 Pa·s or less at 200° C. and a shear rate of 0.1 s$^{-1}$ into a filament shape to provide a formed material, and conveying and concurrently cooling the formed material. The present invention also provides a resin composition for melt spinning being a filament, and a method for producing fiber using a melt spinning apparatus.

20 Claims, 6 Drawing Sheets

(51) Int. Cl.

| | |
|---|---|
| *B29C 31/08* | (2006.01) |
| *B29C 64/118* | (2017.01) |
| *B29C 64/209* | (2017.01) |
| *B29C 64/295* | (2017.01) |
| *B33Y 10/00* | (2015.01) |
| *B33Y 30/00* | (2015.01) |
| *D01D 1/06* | (2006.01) |
| *D01D 5/00* | (2006.01) |
| *D01D 5/08* | (2006.01) |
| *D01D 7/00* | (2006.01) |
| *D01F 6/06* | (2006.01) |
| *D01F 6/62* | (2006.01) |
| *D06M 10/00* | (2006.01) |
| *B29K 67/00* | (2006.01) |

(52) U.S. Cl.
CPC ..... *B29K 2067/046* (2013.01); *Y10T 428/298* (2015.01)

(58) Field of Classification Search
CPC . B29C 64/295; B29K 2067/046; B33Y 10/00; B33Y 30/00; D01D 5/08; D01D 7/00; D06M 10/00
USPC ........... 264/176.1, 211.12, 211.14, 237, 308, 264/331.21, 465, 555; 425/71, 72.2, 425/174.8 E, 375
See application file for complete search history.

(56) References Cited

U.S. PATENT DOCUMENTS

| | | | |
|---|---|---|---|
| 6,656,583 | B1 | 12/2003 | Cziollek et al. |
| 2002/0002241 | A1 | 1/2002 | Raetzsch et al. |
| 2006/0057350 | A1 | 3/2006 | Ochi et al. |
| 2010/0010186 | A1 | 1/2010 | Taniguchi et al. |
| 2011/0183563 | A1 | 7/2011 | Ochi et al. |
| 2011/0262683 | A1 | 10/2011 | Mochizuki et al. |
| 2012/0086147 | A1 | 4/2012 | Sato et al. |
| 2015/0354311 | A1 | 12/2015 | Okura et al. |
| 2016/0346997 | A1 * | 12/2016 | Lewis ................... B29C 64/118 |
| 2018/0051392 | A1 | 2/2018 | Hahm et al. |
| 2018/0065294 | A1 * | 3/2018 | Yamashita ............ B29C 64/118 |

FOREIGN PATENT DOCUMENTS

| | | | | |
|---|---|---|---|---|
| CN | 105713362 | A | 6/2016 | |
| CN | 107614773 | A | 1/2018 | |
| CN | 109666272 | A * | 4/2019 | .......... B29C 64/118 |
| CN | 109735071 | A | 5/2019 | |
| EA | 004441 | B1 | 4/2004 | |
| EP | 3 988 691 | A1 | 4/2022 | |
| JP | 2005-154927 | A | 6/2005 | |
| JP | 2007-262644 | A | 10/2007 | |
| JP | 2007-321246 | A | 12/2007 | |
| JP | 2010-538183 | A | 12/2010 | |
| JP | 2013-64203 | A | 4/2013 | |
| JP | 2017-190533 | A | 10/2017 | |
| JP | 2018-144308 | A | 9/2018 | |
| JP | 2019-49078 | A | 3/2019 | |
| JP | 2019-73827 | A | 5/2019 | |
| JP | 2021-92010 | A | 6/2021 | |
| TW | 201031700 | A1 | 12/2009 | |
| WO | WO 2007/105479 | A1 | 9/2007 | |
| WO | WO 2014/109347 | A1 | 7/2014 | |
| WO | WO 2016/144105 | A1 | 9/2016 | |
| WO | WO 2019/219866 | A1 | 11/2019 | |

OTHER PUBLICATIONS

International Search Report mailed on Dec. 22, 2020 in PCT/JP2020/041508 filed on Nov. 6, 2020.
International Preliminary Report on Patentability dated Nov. 5, 2020, in PCTIJP2020/04158 (with English Translation).
Extended European Search Report issued Dec. 11, 2023 in European Patent Application No. 20894931.3, 8 pages.

* cited by examiner

MELT SPINNING RESIN COMPOSITION, MANUFACTURING METHOD FOR SAME, AND FIBER MANUFACTURING METHOD

CROSS REFERENCE TO RELATED APPLICATIONS

This application is a divisional of U.S. application Ser. No. 17/632,084, filed on Feb. 1, 2022, which is a National Stage entry under 35 U.S.C. § 371 of PCT/JP2020/041508, filed on Nov. 6, 2020, and claims priority to Japanese Patent Application No. 2019-218117, filed on Dec. 2, 2019, and to Japanese Patent Application No. 2019-218118, filed on Dec. 2, 2019, the entire contents of which are incorporated herein by reference.

TECHNICAL FIELD

The present invention relates to a resin composition for melt spinning, a method for producing the same, and a method for producing a fiber.

BACKGROUND ART

A melt spinning method is a technique which can produce a fiber sheet made of a fiber having a small diameter in a simple manner with a high productivity by discharging a molten liquid of a material resin in the presence of gas flow or electric field. The present applicant proposed an apparatus for producing a fiber according to a melt electrospinning method, and a method for producing a fiber (Patent Literature 1).

Patent Literature 2 discloses a method for producing a fine thermoplastic resin fiber by melt electrospinning a thermoplastic resin thread having a diameter of 1.0 mm or less. Patent Literature 3 discloses a filament of an olefinic thermoplastic elastomer composition including a polypropylene resin having a melt mass flow rate of 0.1 to 30 g/10 min, olefinic copolymer rubber, and a softener. The filament is produced by melting and then drawing the material, and Patent Literature 3 discloses use of the filament for three-dimensional printing.

CITATION LIST

Patent Literatures

Patent Literature 1: JP2017-190533A
Patent Literature 2: JP2007-321246A
Patent Literature 3: JP2018-144308A

SUMMARY OF INVENTION

The present invention relates to a resin composition for melt spinning (hereinafter also referred to as a melt spinning resin composition).

In one embodiment, the melt spinning resin composition is a filament.

In one embodiment, the filament has a melt viscosity of 250 Pa·s or less at 200° C. and a shear rate of 0.1 s$^{-1}$.

In one embodiment, the filament has a tensile strength of 10 MPa or more.

The present invention also relates to a method for producing a resin composition for melt spinning, the resin composition being a filament.

In one embodiment, the method includes forming a molten liquid of a resin composition into a filament shape to provide a formed material, wherein the resin composition has a melt viscosity of 250 Pa·s or less at 200° C. and a shear rate of 0.1 s$^{-1}$.

In one embodiment, the method includes conveying and concurrently cooling the formed material in a filament shape.

The present invention further relates to a method for producing fiber using a melt spinning apparatus.

In one embodiment, the melt spinning apparatus includes: a supply port to which a material is supplied; a heating section which melts the material supplied from the supply port, without application of any kneading force; and a nozzle which is in direct communication with the heating section and discharges the material in a molten state.

In one embodiment, as the material, a resin composition for melt spinning is used which is a filament and has a melt viscosity of 250 Pa·s or less at 200° C. and a shear rate of 0.1 s$^{-1}$ and a tensile strength of 10 MPa, or more.

In one embodiment, the method includes supplying the filament from the supply port and concurrently discharging the material in a molten state from the nozzle to be spun.

Other features of the present invention will be apparent from claims and the following description.

DESCRIPTION OF EMBODIMENTS

Figures 1, 2:
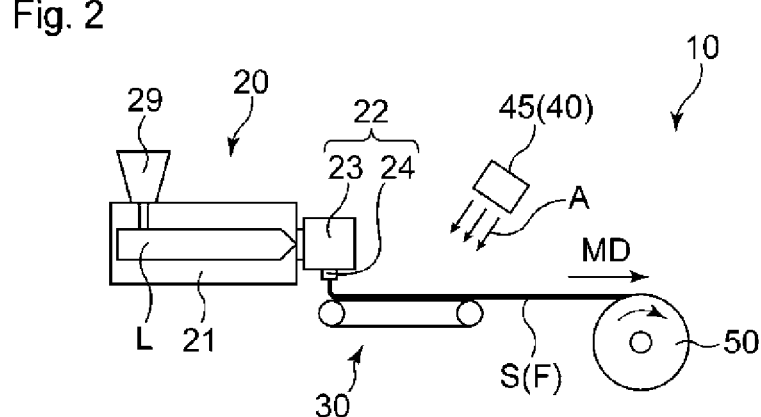
FIG. 1 is a schematic view illustrating one embodiment of the filament producing apparatus of the present invention.
FIG. 2 is a schematic view illustrating another embodiment of the filament producing apparatus of the present invention.

Herein, when a numerical range is prescribed by an upper limit value or a lower limit value, or upper/lower limit values, the upper limit value and the lower limit value by themselves are also included in the numerical range. Also, even if not clearly specified, it is herein construed that all numerical values and numerical fractional ranges included within the numerical range of the upper limit value or less, that of the a lower limit value or more, or that from the lower limit value to the upper limit value are explicitly described.

Herein, for example, "a" and "an" are construed as meaning "one or more".

It is understood that various modifications and alterations of the present invention can be made in view of the above disclosure and the following disclosure. Accordingly, it is to be understood that the present invention can also be carried out according to any embodiment not explicitly described herein as long as the embodiment is within the claimed technical scope.

All the contents described in the above Patent Literatures and the following Patent Literatures are herein incorporated as part of the content of the present description.

The present application claims the priorities to Japanese Patent Application No. 2019-218117 filed on Dec. 2, 2019 and Japanese Patent Application No. 2019-218118 filed on Dec. 2, 2019, the contents of which are incorporated herein entirely by reference as part of the present description.

There is a need for a melt spinning method for producing a fiber and a fiber sheet with high production efficiencies which simultaneously allows for an enhancement in ease of handling of a material, prevention of thermal degradation of the material, and continuous supply of the material. In general, in a case where such a method is adopted, problems with facilities can arise, including introduction of new facilities and complication of operations of facilities. In a case where a large amount of a material is molten and provided, not only much thermal energy is needed, but also thermal degradation of the material can be caused since much time is consumed to melt and provide the material. There have not been made any studies to solve such problems, in Patent Literatures 1 to 3.

Accordingly, the present invention relates to a melt spinning resin composition being a filament having much ease of both handling and continuous supply.

Hereinafter, the present invention is described based on its preferable embodiments with reference to the drawings.

The resin composition is a solid or hollow filament having a predetermined melt viscosity and a predetermined tensile strength.

The resin composition, which is to be heated and molten to obtain a molten liquid thereof, is suitably used in melt spinning such as a melt blowing method and a melt electrospinning method. A melt blowing method and a melt electrospinning method, among melt spinning methods, are spinning methods particularly suited for producing an ultra-fine fiber.

The resin composition preferably has a melt viscosity at a temperature of 200° C. and a shear rate of 0.1 s$^{-1}$, of 250 Pa·s or less, more preferably 150 Pa·s or less, even more preferably 80 Pa·s or less, even more preferably 30 Pa·s or less, in view of achieving a decrease in diameter of a fiber spun.

The resin composition preferably has a melt viscosity at a temperature of 200° C. and a shear rate of 0.1 s$^{-1}$, of 0.05 Pa·s or more, more preferably 0.1 Pa·s or more, even more preferably 0.5 Pa·s or more, in view of satisfying both an enhancement in the ability to form a filament and inhibition of unintended breaking of a fiber spun.

The melt viscosity within such a range enables a decrease in diameter of a fiber to be obtained in melt spinning of the resin composition.

In addition, the melt viscosity within such a range can achieve enhanced efficiency in discharging a molten liquid in melt spinning of the resin composition to result in an enhancement in efficiency in fiber formation.

The melt viscosity of the resin composition can be appropriately varied by, for example, changing the molecular weight of a material resin to be used, or adding a plasticizer, a modifier, and/or another additive described later.

The melt viscosity of the resin composition can be determined by the following method in conditions of a temperature of 200° C. and a shear rate of 0.1 s$^{-1}$ using a rheometer (model number: MCR302) manufactured by Anton Paar Japan K. K., on a sample of the resin composition obtained using a known extruder.

<Method for Measuring Melt Viscosity of Resin Composition>

Specifically, first, a measurement sample is filled into a hole (100 mm×100 mm×1 mm) formed in a SUS plate coated with a fluororesin.

Next, the measurement sample filled is preliminarily pressurized by heat pressing at a temperature of 180° C. and a set pressure of 0.5 MPa per 300 mm×300 mm for 1.5 minutes using a known heat press machine.

Thereafter, removal of air from the sample is performed by repeating a cycle of pressurizing and depressurizing four times, wherein pressurizing in the above-mentioned pressurizing conditions for 3 seconds and depressurizing for 1 second is defined as one cycle.

Subsequently, main pressurizing is performed by heat pressing at a temperature of 180° C. and a set pressure of 20 MPa per 300 mm×300 mm for 1 minute.

Finally, cooling is performed by pressing at a temperature of 14° C. and a set pressure of 0.5 MPa per 300 min×300 mm for 1 minute.

A press molded plate obtained by the above method is cut to a size of 50 mm diameter×1 mm thickness, to thereby obtain a circular specimen plate. The specimen plate is introduced into the rheometer with a measurement tool of plate-plate type or cone-plate type having a diameter of 50 mm. The specimen plate is molten at a temperature of 200° C., and the melt viscosity is measured in a condition of a shear rate of 0.1 s$^{-1}$.

The resin composition preferably has a tensile strength of 10 MPa or more, more preferably 12 MPa or more, even more preferably 15 MPa or more, in view of satisfying and enhancing both case of handling of the filament and ease of continuously supplying of the filament in fiber spinning.

The resin composition preferably has a tensile strength of 150 MPa or less, more preferably 120 MPa or less, even more preferably 100 MPa or less, in view of enhancing ease of winding and storing in the case of winding and storing of the filament.

The resin composition having a tensile strength within such a range can be not only easily handled, but also easily continuously supplied as a material for melt spinning, resulting in an enhancement in efficiency in producing fiber.

The tensile strength of the resin composition can be appropriately varied by, for example, changing the type of a resin to be used, varying the temperature and speed of cooling to bring about the variation in crystal state of the resulting resin composition, or adding a plasticizer, a modifier, and/or another additive described later.

The resin composition preferably has a breaking strain of 1% or more, more preferably 1.5% or more, even more preferably 2% or more, even more preferably 2.5% or more, in view of satisfying and enhancing both ease of handling of the filament and ease of continuous supply of the filament in fiber spinning.

The breaking strain of the resin composition is practically 20% or less, preferably 18% or less, but not particularly limited thereto.

The resin composition having a breaking strain within such a range can be not only easily handled, but also easily continuously supplied as a material for melt spinning, resulting in an enhancement in efficiency in producing fiber.

The breaking strain of the resin composition can be appropriately varied by, for example, changing the type of a resin to be used, varying the temperature and speed of cooling to bring about the variation in crystal state of the resulting resin composition, or adding a plasticizer, a modifier, and/or another additive described later.

The tensile strength and the breaking strain of the resin composition are measured with a tensile tester (AG-X plus manufactured by Shimadzu Corporation). The test is performed on a resin composition in the form of a filament having a length of 120 mm, at a test speed of 50 mm/min and a distance between chucks of 80 mm, to thereby measure the maximum test force and the chuck travel distance until breaking in the tensile test performed along with the filament length direction. The measurement is made in triplicate.

For each of the tensile strength and tile breaking strain, the three found values are substituted to the following expression, and the arithmetic average value of the three resulting solutions is used as the tensile strength and the breaking strain. In the following expressions, R represents a cross-sectional diameter of the filament described later.

$$\text{Tensile strength [MPa]} = \frac{\text{(Maximum test force [N])}}{(\pi \times (\text{Cross-sectional diameter of filament } R \text{ at initiation of tensile test})^2/4)}$$

$$\text{Breaking strain [\%]} = \frac{\text{(Chuck travel distance [mm]}}{\text{Distance [mm] between chucks at initiation of tensile test)}} \times 100$$

As described above, the resin composition is a filament. The average value of the cross-sectional diameters of the filament of the resin composition, namely, the cross-sectional average diameter in a direction perpendicular to the length direction of the filament, R, is preferably 1 mm or more, more preferably 1.3 mm or more, even more preferably 1.5 mm or more, in view of satisfying and enhancing both ease of handling of the filament and ease of continuous supply of the filament in fiber spinning.

The cross-sectional average diameter R is preferably 30 mm or less, more preferably 20 mm or less, even more preferably 15 mm or less, even more preferably 5 mm or less, even more preferably 3 mm or less, in view of ease of melting of the filament.

The filament commonly means a fiber having an infinite length with substantially no end; however, the filament herein is substantially more broadly interpreted. Specifically, the filament herein encompasses fibers having a ratio of the length to the cross-sectional average diameter R (length of filament/cross-sectional average diameter R of filament) of preferably 20 or more, more preferably 50 or more, even more preferably 100 or more, in view of easily forming a filament in a bar shape to result in an enhancement in ease of handling in introduction of the filament into a spinning apparatus.

The filament has a substantially infinite length, and thus the ratio does not have any upper limit value, and is actually 1 000 000 or less in view of an enhancement in ease of storage of the filament.

The filament has an infinite length, as described above, and the length thereof is preferably 10 000 m or less, even more preferably 5 000 m or less in view of an enhancement in ease of storage of the filament.

The filament which preferably has a length of 50 mm or more, even more preferably 100 mm or more is encompassed by the filament herein, in view of easily forming a filament in a bar shape to result in an enhancement in ease of handling in introduction of the filament into a spinning apparatus.

Such a filament can be obtained by, for example, cutting a filament having an infinite length to a predetermined length.

The filament length can be determined by measuring the winding length and/or the winding diameter, or can be calculated from the dimensions of the length measured and the winding diameter.

Thus, the filament diameter, the filament length, and the ratio of length/cross-sectional average diameter R of the filament within the above-mentioned respective ranges enable much ease of handling of the filament in storage and in spinning.

<Method for Measuring Filament Cross-Sectional Average Diameter>

The filament cross-sectional average diameter can be measured in the following manner. One filament having a length of more than 50 cm is provided, and the size in the direction perpendicular to the length direction of the filament (i.e., the thickness of the filament) is measured with a caliper at 10 points positioned at an interval of 5 cm along with the length direction of the filament. The arithmetic average value of the found values is used as the cross-sectional average diameter. In a case where the cross section of the filament is not a true circle, the filament cross-sectional average diameter can be measured in the following manner: the longer diameter and the shorter diameter are each measured with a caliper at each measurement point; the arithmetic average value of the longer diameter and the shorter diameter at each measurement point is used as the found value at that measurement point; and the arithmetic average value of the found values at all measurement points is used as the "filament cross-sectional average diameter".

The standard deviation of the cross-sectional diameter of the filament is a measure of uniformity of the cross-sectional diameter of the filament. For determining the standard deviation of the cross-sectional diameter of the filament, the standard deviation is calculated from the found values at 10 points by the above-mentioned method. A smaller standard deviation means that the cross-sectional diameter in the one filament is more uniform.

The resin composition, which is a filament, preferably includes a thermoplastic resin as a main component thereof. The "main component" herein means a component whose content in the resin composition is 50% by mass or more.

The thermoplastic resin has the ability to form fibers in melt spinning, and has a melting point.

The resin "having a melting point" is any resin which exhibits an endothermic peak in differential scanning calorimetry due to phase transition from solid to liquid before pyrolysis of the resin when heating the resin as the object to be measured.

Examples of the thermoplastic resin include polyolefin resin, a polyester resin, a polyamide resin, a vinyl polymer, an acrylic polymer, a nylon-based polymer, polyvinyl acetate, and a polyvinyl acetate-ethylene copolymer.

Examples of the polyolefin resin include polyethylene, polypropylene (PP), an ethylene-α-olefin copolymer, and an ethylene-propylene copolymer.

Examples of the polyester resin include polyethylene terephthalate, polybutylene terephthalate, a liquid crystal polymer, and a polylactic acid-based resin.

Examples of the polylactic acid-based resin include polylactic acid (PLA) and a lactic acid-hydroxycarboxylic acid copolymer.

Examples of the vinyl polymer include polyvinyl chloride, polyvinylidene chloride, and polystyrene.

Examples of the acrylic polymer include polyacrylic acid, polyacrylate, polymethacrylic acid, and polymethacrylate.

Examples of the nylon-based polymer include nylon 6 and nylon 66.

The resin here used may be a commercially available product, a resin obtained by subjecting a commercially available product to a post-treatment such as hydrolysis, or a synthetic compound. These resins can be used singly or in combinations of two or more thereof.

The resin composition preferably includes one or more selected from a polyolefin resin and a polyester resin, even more preferably includes one or more selected from PP and a polylactic acid-based resin, among the above, in view of enhancing mechanical properties, such as strength and flexibility, of the resin composition in the form of a filament, and in view of increasing versatility of application of a fiber when the filament is used to produce the fiber. The lactic acid for a repeating unit of the polylactic acid-based resin may be any optical isomer of an L-form and a D-farm.

The content of the thermoplastic resin included in the resin composition is preferably 70 parts by mass or more, more preferably 75 parts by mass or more, even more preferably 80 parts by mass or more, even more preferably 95 parts by mass or more based on 100 parts by mass of the resin composition, in view of leaving a room for adding an additive to improve the ability to form fibers.

The content of the thermoplastic resin is preferably 100 parts by mass or less based on 100 parts by mass of the resin composition, in view of an increase in versatility of application of the fiber.

<Method for Measuring Content of Thermoplastic Resin in Resin Composition>

The content of the thermoplastic resin in the resin composition can be measured by the following method. Specifically, the content of the thermoplastic resin included in the resin composition can be measured by subjecting the resin composition to any of various analyses such as NMR (nuclear magnetic resonance) analysis and IR (infrared spectroscopic) analysis to identify the structure of a molecular backbone and the structure of a functional group at the end of the molecular structure, based on the positions of each signal and each spectrum obtained by such analysis. Thus, the type of a resin contained is identified, and the amount of each thermoplastic resin included in the resin composition is calculated from the intensity of the result for the molecular structure corresponding to the thermoplastic resin. The resulting values were summed up to determine the content of the thermoplastic resin in the resin composition.

In a case where the resin composition includes the thermoplastic resin, a PP resin is preferably included as the thermoplastic resin because of high flexibility and high chemical resistance. A polylactic acid-based resin is also preferably included as the thermoplastic resin because of high versatility and biodegradability. The resin composition more preferably includes a PP resin or a polylactic acid-based resin as a main component, in view of exhibiting high flexibility and chemical resistance, or high versatility and biodegradability.

Whether or not a PP resin or a polylactic acid-based resin is included in the resin composition can be determined by the following method. The resin composition in question is subjected to various analyses such as NMR analysis and IR analysis, as described above, to identify the structure of a molecular backbone and the structure of a functional group at the end of the molecular structure. Thus, how many kinds (a single kind or two or more kinds) of resins the resin composition includes, and whether the resin composition includes a PP resin or a polylactic acid-based resin can be determined.

In a case where a PP resin is included as the thermoplastic resin in the resin composition, the weight-average molecular weight thereof is preferably 150 000 g/mol or less, more preferably 100 000 g/mol or less, even more preferably 80 000 g/mol or less, in view of achieving a decrease in diameter of a fiber in spinning.

In a case where a PP resin is included as the thermoplastic resin in the resin composition, the weight-average molecular weight thereof is preferably 1 000 g/mol or more, more preferably 5 000 g/mol or more, even more preferably 10 000 g/mol or more, in view of satisfying both an enhancement in the ability to form a filament and inhibition of unintended breaking of a fiber spun.

In a case where a polylactic acid-based resin is included as the thermoplastic resin in the resin composition, the weight-average molecular weight thereof is preferably 150 000 g/mol or less, more preferably 100 000 g/mol or less, even more preferably 80 000 g/mol or less, even more preferably 50 000 g/mol or less, in view of a decrease in diameter of a fiber in spinning.

In a case where a polylactic acid-based resin is included as the thermoplastic resin in the resin composition, the weight-average molecular weight thereof is preferably 1 000 g/mol or more, more preferably 5 000 g/mol or more, even more preferably 10 000 g/mol or more, in view of satisfying both an enhancement in the ability to form a filament and inhibition of unintended breaking of a fiber spun.

In a case where the thermoplastic resin includes a polylactic acid-based resin, the weight-average molecular weight of the polylactic acid-based resin can be measured by using gel permeation chromatography. In a case where the weight-average molecular weight in terms of polystyrene is measured by using gel permeation chromatography, a pretreatment is performed which involves dissolving the thermoplastic resin in question at a predetermined concentration in an eluent described below, and removing insoluble impurities to prepare a solution. Thereafter, the solution is used as a measurement sample to perform measurement of the molecular weight distribution in the following conditions by gel permeation chromatography.

A molecular weight calibration curve is created in the same manner in advance, by use of polystyrene samples (monodisperse polystyrenes manufactured by Tosoh Corporation (model numbers: F450, F288, F128, F80, F40, F20, F10, F4, F1, A5000, A2500, A1000, A500 and A300), whose weight-average molecular weights are known and which are different in weight-average molecular weight, as polystyrene standard samples, and the weight-average molecular weight in terms of polystyrene can be determined by comparing the calibration curve and the results of the measurement sample.

This measurement method allows one having a larger molecular weight to be earlier eluted based on the principle of gel permeation chromatography, and thus the molecular weight distribution of the measurement sample can be obtained by determining a component eluted when the measurement sample passes through the column, and the mass thereof and the time therefor, and comparing the results with the calibration curve.

<Conditions of gel permeation chromatography>
Gel permeation chromatograph: HLC-8220GPC (manufactured by Tosoh Corporation)
Column: GMHHR-H+GMHHR-H (manufactured by Tosoh Corporation)
Eluent: 1 mmol Farmin DM20 (manufactured by Kao Corporation)/CHCl3
Flow rate of eluent: 1.0 mL/min
Column temperature: 40° C.
Detector: RI Concentration of sample: 0.1% by volume (solution in chloroform)

Amount of sample injected: 100 mL

In a case where two or more kinds of resins are included in the resin composition, the types of the thermoplastic resins included are identified by various analyses such as NMR analysis and IR analysis, described above. Next, the polylactic acid-based resin is extracted with a solvent which can dissolve the polylactic acid resin and cannot dissolve other resin, or a solvent which cannot dissolve the polylactic acid-based resin but can dissolve other resin. The polylactic acid-based resin extracted is used as an object to be measured, and the weight-average molecular weight thereof is measured by the above-mentioned method.

In a case where the thermoplastic resin includes a polypropylene resin, the weight-average molecular weight can be measured by the above-mentioned measurement method using a solution obtained by dissolving a polypropylene resin in o-dichlorobenzene used as an eluent at a dissolution temperature of 140 to 150° C.

The resin composition may include one or more additives selected from an elastomer, a plasticizer, a modifier, a decomposition inhibitor, and a charge control agent depending on the application of melt spinning, in view of an enhancement in efficiency in producing fiber. These additives can be used singly or in combinations of two or more thereof.

The elastomer can enhance the elasticity and therefore toughness of the resin composition. The elastomer here used can be, for example, a polyolefinic elastomer, a polystyrene-based elastomer, a polyester-based elastomer, or a polyurethane-based elastomer.

The content and the molecular structure of the additive in the resin composition can be determined and identified by any known technique such as NMR, various kinds of chromatography or IR analysis, or a combination thereof. The content of the additive can be determined from the intensity of the result for the molecular structure in such a measurement method.

The additive can also be analyzed by pyrolysis gas chromatograph (GC-MS) on a concentrated liquid obtained by subjecting the fiber in question to soxhlet extraction/concentration of the additive with any of various solvents. A mass spectrum here obtained can be used to not only identify the compound, but also calculate the content.

The plasticizer allows for modification to increase flexibility of the resin composition, change the glass transition temperature (Tg) of the resin composition, and increase fluidity of a molten liquid of the resin composition.

The plasticizer here used can be, for example, polyethylene glycol (PEG), glycerin, glycerin fatty acid ester, glycerin acetate, phosphate, a cellulose derivative (hydroxypropylcellulose: HPC or methylcellulose: MC), lactone, carbamate, or phthalic acid.

The modifier allows for modification to increase flexibility of the resin composition and increase fluidity of a molten liquid of the resin composition.

The modifier here used can be, for example, a low crystalline polyolefin such as a low stereoregular polyolefin (modifier for forming process, L-MODU manufactured by Idemitsu Kosan Co., Ltd.).

The decomposition inhibitor allows for prevention of decomposition and reduction in the molecular weight in the resin composition when a molten liquid of the resin composition is subjected to melt spinning by a melt blowing method and a melt electrospinning method.

Examples of the decomposition inhibitor include carbodiimide compounds such as a monocarbodiimide compound and a polycarbodiimide compound. These additives can be used singly or in combinations of a plurality thereof.

Examples of the monocarbodiimide compound include an aromatic monocarbodiimide compound, an alicyclic monocarbodiimide compound, and an aliphatic monocarbodiimide compound.

Examples of the aromatic monocarbodiimide compound include diphenylcarbodiimide, di-2,6-dimethylphenylcarbodiimide, di-2,6-diethylphenylcarbodiimide, di-2,6-diisopropylphenylcarbodiimide, di-2,6-di-tert-butylphenylcarbodiimide, di-o-tolylcarbodiimide, di-p-tolylcarbodiimide, di-2,4,6-trimethylphenylcarbodiimide, di-2,4,6-triisopropylphenylcarbodiimide, and di-2,4,6-triisobutylphenylcarbodiimide.

Examples of the alicyclic monocarbodiimide compound include di-cyclohexylcarbodiimide and di-cyclohexylmethanecarbodiimide.

Examples of the aliphatic monocarbodiimide compound include di-isopropylcarbodiimide and di-octadecylcarbodiimide.

Examples of the polycarbodiimide compound include an aromatic polycarbodiimide compound and an alicyclic polycarbodiimide compound.

Examples of the aromatic polycarbodiimide compound include poly(4,4'-diphenylmethanecarbodiimide), poly(p-phenylenecarbodiimide), poly(m-phenylenecarbodiimide), poly(diisopropylphenylcarbodiimide), and poly(triisopropylphenylcarbodiimide).

Examples of the alicyclic polycarbodiimide compound include poly(dicyclohexylmethanecarbodiimide).

The charge control agent allows for modification to enable a molten liquid of the resin composition to carry a large amount of electrical charge when the molten liquid is subjected to a melt electrospinning method.

Examples of the charge control agent include a salt of a higher fatty acid and a metal, a sulfate salt, and sulfonate salt.

The higher fatty acid typically has 12 or more and 24 or less carbon atoms. The fatty acid moiety thereof may have an unsaturated bond. The metal salt may be a salt of Zn, Mg, or Li, for example.

Examples of the salt of a higher fatty acid and a metal include Zn stearate, Mg stearate, Li stearate, Zn laurate, and Zn ricinoleate.

Examples of the sulfate salt include alkylsulfate salt and alkyl ether sulfate salt. Examples of the sulfonate salt include alkylsulfonate salt, alkylbenzenesulfonate salt, alkylnaphthalenesulfonate salt, olefinsulfonate salt, N-alkyl-N-acylaminoalkylsulfonate salt, and alkanesulfonate salt.

Examples of the N-alkyl-N-acylaminoalkylsulfonate salt include, but not limited to, sodium N-stearoyl methyl taurate.

These additives can be used singly or in combinations of two or more thereof.

The content of the additive(s) in the resin composition is preferably 0 parts by mass or more based on 100 parts by mass of the resin composition, in view of an increase in efficiency in production of a small diameter fiber.

The content of the additive(s) in the resin composition is preferably 40 parts by mass or less, more preferably 30 parts by mass or less, even more preferably 20 parts by mass or less, even more preferably 15 parts by mass or less based on 100 parts by mass of the resin composition, in view of an enhancement in strength of a small diameter fiber.

The above-mentioned resin composition has a predetermined melt viscosity. Accordingly, when the resin composition is turned into the form of a molten liquid to subject to melt spinning, the amount and the speed of the molten liquid discharged to the exterior can be increased, and also efficiency in drawing the molten liquid can be increased, thereby producing a small diameter fiber with a high production efficiency.

The resin composition is a filament having predetermined tensile strength. Accordingly, when the filament is stored or subjected to melt spinning, any accidental occurrence of fracturing or cracking, buckling, or breaking can be reduced to enhance ease of storage and handling of the resin composition in the form of a filament.

According to a preferable embodiment of the resin composition being a filament, the resin composition has high flexibility and can be handled with much ease in storage and in spinning, and also efficiency in producing fiber can be further enhanced.

Additionally, even in a case where a polylactic acid-based resin, which has been difficult to apply to melt spinning in the conventional art, is used, a small diameter fiber can be efficiently produced while the material is prevented from degradation due to heat in melting and/or hydrolysis.

The use of the resin composition, which is in the form of a filament, enables producing a fiber and/or a fiber sheet by a melt spinning method with a simple operation, specifically, melting only part of the material in the form of a filament. As a result, downsizing and labor-saving of facilities can be achieved without introducing any large-scaled facilities, unlike a case where melt spinning is performed while preparing a molten liquid from a resin material in the form of powder or pellets using an extruder or the like. Additionally, only part of the resin composition is molten when subjected to melt spinning, and thus there is no need for melting of the entire resin composition which is to be subjected to fiber formation. Thus, thermal degradation of the material can be prevented.

Next, the method for producing the resin composition being a filament is described.

The method can be suitably carried out by a filament producing apparatus 10 illustrated in FIG. 1 to FIG. 5. The producing apparatus 10 illustrated in FIG. 1 is composed roughly of an extruding section 20 and a conveying section 30.

The extruding section 20 includes a cylinder 21, a discharge section 22, and a hopper 29 which supplies the resin composition.

In the cylinder 21, the resin composition supplied from the hopper 29 can be heated and molten, thereby providing a molten liquid L of the resin composition.

The molten liquid can be supplied by pushing the molten liquid toward the discharge section 22 described below, by a screw (not shown) provided in the cylinder 21.

The discharge section 22 is a member which extrudes the molten liquid of the resin composition into a filament shape, and includes a discharge base 23 and a discharge port 24.

The cylinder 21, the discharge base 23, and the discharge port 24 are in communication, and thus the molten liquid in the cylinder 21 is continuously pushed out from the discharge port 24 via the discharge base 23.

A gear pump (not shown) is provided in the discharge base 23, and thus the molten liquid of the resin composition can be discharged in a fixed amount.

The conveying section 30 conveys a formed material S in the shape of a filament extruded from the discharge port 24 to the next step.

The conveying section 30 is provided at a position substantially opposite to the discharge port 24 and apart therefrom, and is composed of one or more of a conveyor and a roller.

The conveying section 30 illustrated in FIG. 1 and FIG. 2 is in the form of a belt conveyor in which an endless belt is provided so as to go around in one direction, and can directly receive the formed material. S via no any other member and convey the formed material S which is in direct contact with the belt conveyor.

Figures 3A, 3B:
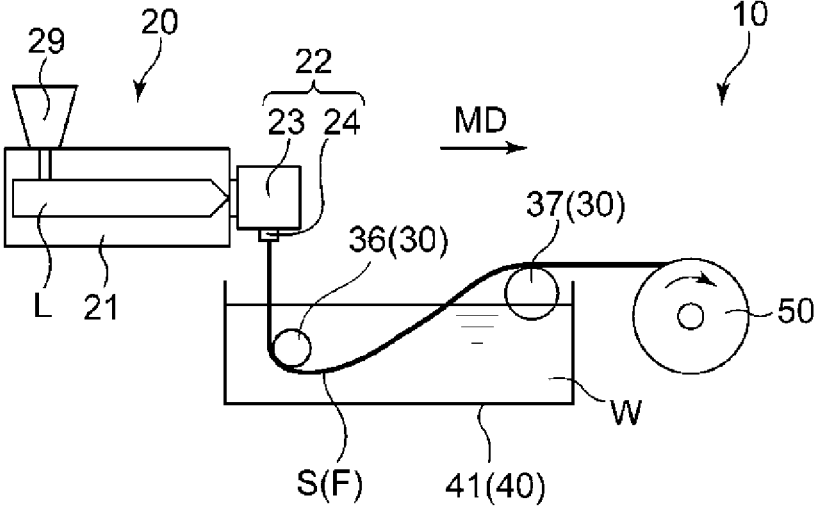
FIGS. 3($a$) and ($b$) are each a cross-sectional schematic view illustrating still another embodiment of the filament producing apparatus of the present invention.
Figure 4:
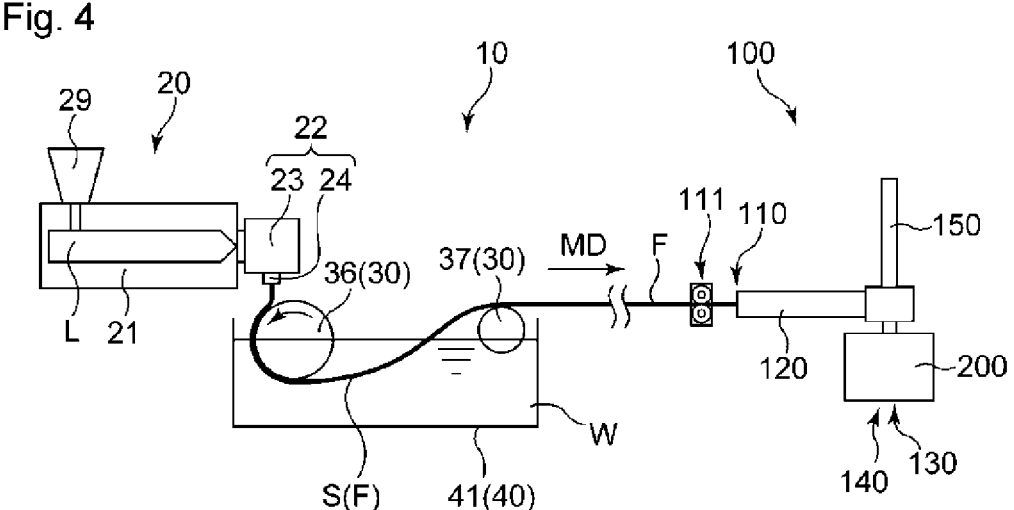
FIG. 4 is a schematic view illustrating one embodiment of a melt spinning apparatus including the filament producing apparatus illustrated in FIG. 3($a$).

The conveying section 30 illustrated in FIGS. 3(a) and (b) and FIG. 4 is in the form of conveying rollers 36 and 37.

The producing apparatus 10 is characterized in that the distance between the discharge port 24 and the conveying section 30 in the extruding section 20 is within a predetermined range, and that the diameter of the discharge port 24 is within a predetermined range.

When a resin composition is extruded into a filament shape from the discharge port 24 of the producing apparatus 10 having such a configuration, the formed material can be drawn to an intended shape while preventing dripping from the discharge port 24 and therefore accidental attachment of the discharged and formed material to any member other than the conveying section 30. Such advantage is given even when the resin composition introduced into the producing apparatus has a relatively small melt viscosity and turns into a molten liquid with high fluidity. As a result, a uniform and continuous filament can be formed.

Figure 5A:
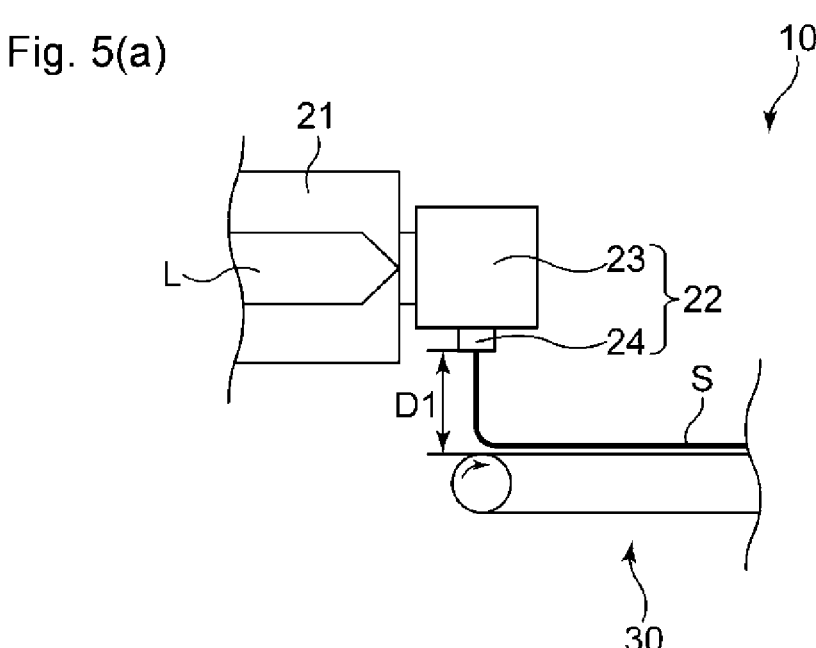
FIGS. 5($a$) and ($b$) are each an enlarged schematic view illustrating positions of a discharge port and a conveying section arranged.

Specifically, the distance D1 between the discharge port 24 in the extruding section 20 and the conveying section 30 (see FIGS. 5(a) and (b)) is preferably 50 mm or less, more preferably 30 mm or less, even more preferably 15 mm or less, in view of preventing the formed material from being drawn to an unintended shape to result in a filament having a uniform shape.

The distance D1 is preferably 1 mm or more, more preferably 3 mm or more, even more preferably 5 mm or more, in view of stabilizing the shape of the molten liquid extruded from the discharge port to increase uniformity of the shape of the resulting filament.

The distance D1 between the discharge port 24 and the conveying section 30 is a minimum distance from the end of the discharge port 24 to the intersection point between an imaginary line extending along with the axis direction of the discharge port 24 and the face of the conveying section 30.

In a case where the formed material S discharged from the discharge port 24 is directly immersed in a liquid W via no any other member, as illustrated in FIG. 3(b), the distance D1 is a minimum distance between the discharge port 24 and a level of the liquid W.

The diameter of the discharge port 24 is preferably 1 mm or more, more preferably 3 mm or more, even more preferably 5 mm or more, in view of moderately drawing the filament, stabilizing the production, and easily obtaining a filament having a desired diameter.

The diameter of the discharge port 24 is preferably 50 mm or less, more preferably 40 mm or less, even more preferably 30 mm or less, in view of uniformly extruding a molten resin to maintain the form of the molten resin.

The shape of the discharge port 24 is a preferably true circular shape.

The producing apparatus having such a configuration enables formation of a filament of a resin composition which satisfies both much ease of handling and much ease of continuous supply of the filament.

Cooling and solidification of the formed material S in the shape of a filament extruded from the discharge port may insufficiently progress after extrusion in some cases. The producing apparatus preferably includes a device which cools the formed material S while conveying the formed material in one direction MD, in view of certainly maintaining the shape of a filament of the formed material S extruded.

For example, the cooling device may be a long conveying path of the conveying section 30 formed along with a conveying direction to perform natural cooling, or may be the conveying section 30 by itself which is cooled in contact with a cooling medium or a cooling apparatus (not shown). Alternatively, the cooling device is a cooling section 40 included downstream of the conveying section 30.

In a case where the producing apparatus includes the cooling section 40, the cooling section 40 is preferably composed of at least one of a conveyor and a cooling roller cooled in contact with a cooling medium or a cooling apparatus (not shown), a cooling gas supply section which can blow cooling gas flow, a gas tank which contains a cooling gas and through which the formed material S can pass, and a liquid tank which contains a cooling liquid and in which the formed material S can be in contact with a liquid.

The cooling gas can be, for example, air, and the formed material S can be air-cooled.

Water is preferably used as the cooling liquid in view of having no effect on the composition of the formed material S.

In particular, the liquid tank is preferably used, and a liquid tank containing water is even more preferably used, in view of increased efficiency in cooling the formed material.

The producing apparatus 10 illustrated in FIG. 1 includes a cooling section 40 having a liquid tank 41 and a conveying roller 42 downstream of the conveying section 30 in a conveying direction.

The formed material S discharged from the discharge port 24 to be extruded, which is being conveyed by the conveying section 30 and the conveying roller 42, can be brought into contact with a liquid W in the liquid tank 41 so that the formed material S is cooled.

The producing apparatus 10 illustrated in FIG. 2 includes a cooling gas supply section 45 above the conveying section 30 and downstream of the conveying section 30 in a conveying direction, and can perform air-cooling by contacting gas flow A with the formed material S.

In the producing apparatus 10 illustrated in FIG. 3(*a*) and FIG. 4, the conveying roller 36 in the conveying section 30 is partially immersed in the liquid W contained in the liquid tank 41.

In this embodiment, the formed material S discharged from the discharge port 24 is directly received on a periphery of the conveying roller 36, the periphery being not immersed in the liquid W, and the formed material S attached to the periphery is contacted with the liquid W due to rotation of the conveying roller 36, and thus cooled.

Thus, the shape of the formed material S is easily maintained during formation, so that a filament which is more easily stored and handed can be more simply produced.

In the producing apparatus 10 illustrated in FIG. 3(*b*), the conveying roller 36 in conveying section 30 is fully immersed in the liquid W contained in the liquid tank 41.

In this embodiment, the folioed material S discharged from the discharge port 24 is directly contacted with the liquid W and thus cooled, and the formed material S cooled is attached to a periphery of the conveying roller 36 and conveyed.

As described above, the conveying section 30 and the cooling section 40 may be separated, or may be integrated.

The ratio of the temperature of the molten liquid of the resin composition to the temperature in the conveying section 30 or the cooling section 40 (cooling temperature), temperature of molten liquid/cooling temperature, in terms of the absolute temperature is preferably 1.2 or more, more preferably 1.3 or more, even more preferably 1.4 or more, in view of increasing efficiency in cooling the formed material S and forming a filament of the resin composition which highly achieves both ease of handling and ease of continuous supply.

The ratio of the temperature of the molten liquid of the resin composition to the cooling temperature, temperature of molten liquid/cooling temperature, in terms of the absolute temperature is actually 2.1 or less, preferably 1.9 or less, more preferably 1.7 or less.

The temperature of the molten liquid of the resin composition here refers to the temperature of the molten liquid at the discharge port 24.

Advantageously, the temperature ratio in such a range leads to an appropriate degree of crystallization of the resin depending on the cooling speed and to prevention of the occurrence of voids and/or cracks in the filament to give a filament which has both flexibility and strength applicable to a melt spinning method.

The cooling temperature is preferably −40° C. or more, more preferably 0° C. or more, even more preferably 5° C. or more, in view of enhancing efficiency in cooling the formed material S and also forming a filament which has both flexibility and strength.

The upper limit of the cooling temperature may vary depending on the resin used and intended physical properties, and, in a case where water is used for cooling the formed material, the cooling temperature is preferably 90° C. or less, more preferably 80° C. or less, even more preferably 70° C. or less, from the practical viewpoint.

It is also preferable from the same viewpoint that the cooling section 40 be configured to cool the formed material S with a gas or liquid having a temperature in the above-mentioned range.

The method for producing the resin composition being a filament is as follows.

First, a resin composition having a melt viscosity of 250 Pa·s or less at 200° C. and a shear rate of 0.1 s$^{-1}$ is supplied into the cylinder 21 in the extruding section 20, and heated and molten, to provide a molten liquid L of the resin composition.

Next, the molten liquid is supplied toward the discharge port 24 and also the molten liquid is continuously extruded into a filament shape from the discharge port 24, to provide a formed material S in the shape of a filament.

Subsequently, while the formed material S is directly received in the conveying section 30, the formed material S is conveyed downstream and concurrently cooled.

The ratio of the speed of the formed material S conveyed (V2) to the speed of the molten liquid extruded from the discharge port 24 (V1), V2/V1, is preferably 1 or more, more preferably 3 or more, even more preferably 5 or more, even more preferably 7 or more, in view of applying an appropriate external force before sufficient cooling and solidifying of the formed material S to easily form a filament with a uniform surface and shape.

The V2/V1 is preferably 50 or less, more preferably 35 or less, even more preferably 25 or less, in view of prevention of the change in shape due to excessive drawing.

The speed of the molten liquid extruded from the discharge port 24, V1, is preferably 0.1 m/min or more, more preferably 0.15 m/min or more, even more preferably 0.2 m/min or more, from the same viewpoint The speed of the molten liquid extruded from the discharge port 24, V1, is preferably 20 m/min or less, more preferably 10 m/min or less, even more preferably 5 m/min or less, in view of prevention of the change in shape due to excessive drawing.

The extruding speed of the molten liquid from the discharge port 24 can be appropriately changed by, for example, adjusting the speed of the molten liquid supplied from the cylinder 21.

The speed of the formed material S conveyed, V2, is preferably 0.2 m/min or more, more preferably 1.0 m/min or more, even more preferably 1.5 m/min or more, even more preferably 2 or more, from the same viewpoint.

The speed of the formed material S conveyed, V2, is preferably 200 m/min or less, more preferably 100 m/min or less, even more preferably 50 m/min or less, even more preferably 35 m/min or less, in view of prevention of the change in shape due to excessive drawing.

The conveying speed of the formed material S can be appropriately changed by, for example, adjusting the travelling speed of the conveyor and/or the rotating speed of the roller in the conveying section 30, or adjusting the winding speed of the filament in a winding-up section 50 described later.

In a case where the formed material S extruded is conveyed in one direction MD and concurrently cooled, the formed material S may be conveyed by the conveying section 30 and concurrently naturally cooled, or the formed material S may be conveyed by the conveying section 30 and concurrently contacted with a gas or liquid to be cooled, as described above. Alternatively, the formed material S may be conveyed and concurrently cooled in the state where the formed material S is in contact with the conveying section 30 cooled, or the cooling section 40 may be further provided so that the formed material S passes through the cooling section 40 and be concurrently cooled.

A resin composition F being a filament (hereinafter, also simply referred to as "filament F".) can be obtained through the above process.

As illustrated in FIG. 1 to FIG. 3, for example, the resulting filament F may be wound up by a winding-up section 50 to be stored in the form of a roll of the wound filament F.

The roll can be used for continuously or intermittently supplying the filament as a material in a production process of an ultrafine fiber described later.

Alternatively, as illustrated in FIG. 4, the above-mentioned producing apparatus 10 may be incorporated into a melt spinning apparatus 100, and the filament F produced by the producing apparatus 10 may be directly supplied to the melt spinning apparatus 100 to produce a fiber. The detail of the melt spinning apparatus 100 will be described herein later.

In any case, the resin composition being the filament can be directly used as a material for producing a fiber by a melt spinning method and thus can be used in existing facilities with reduction in thermal degradation of the material in melting and without any problem in terms of facilities, for example, expansion of facilities.

The resin composition being the filament has both flexibility and strength, and thus is prevented from fracturing and cracking, buckling, and breaking, which are not intended in storage and/or melt spinning, and therefore, the resin composition being the filament is easier to handle.

A filament produced by the suitable method described above is formed from a molten liquid continuously extruded from the discharge port 24, and thus a single continuous uniform filament can be produced. As a result, in a case where the filament is used as a material to produce a fiber using a melt spinning apparatus 100 described later, such a material can be continuously and stably supplied to produce the fiber stably.

Subsequently, a melt spinning apparatus 100 is described with reference to FIG. 4 and FIG. 6. The melt spinning apparatus 100 can be suitably used in producing a fiber by a melt spinning method, in particular, a melt blowing method or a melt electrospinning method. The melt blowing method and the melt electrospinning method, among melt spinning methods, are each a spinning method particularly suited for producing an ultrafine fiber.

The melt spinning apparatus 100 may be a standing type apparatus, which is suitably mounted on a floor, a shelf, a desk, or the like when use, or a handy type apparatus, which has a handheld size and is suitably used while being held with the human hand.

The melt spinning apparatus 100 illustrated in FIG. 4 includes a supply port 110 to which a material F is supplied, a heating section 120 which melts the material F supplied from the supply port 110 without application of any kneading force, and a nozzle 130 which is in direct communication with the heating section 120 and discharges the molten material.

The material F supplied in the melt spinning apparatus 100 is preferably a material including a thermoplastic resin, and, in particular, the resin composition F being the above-mentioned filament is preferably used therefor.

Additionally, the melt spinning apparatus 100 more preferably includes at least one of a gas flow spraying section 140 which conveys the material F discharged from the nozzle 130 by the gas flow and an electrode 160 which forms an electrical field to electrically charge the material F discharged from the nozzle 130.

The melt spinning apparatus 100 includes a supply port 110 to which the material F is supplied.

The melt spinning apparatus 100 illustrated in FIG. 4 includes a driving section 111 having an electric motor (not shown) such as a stepping motor in the vicinity of the supply port 110, and thus the material F can be continuously supplied toward the supply port 110 at a predetermined speed by rotation of the electric motor.

The electric motor in the driving section 111 is jointed to a gear 113, which is a spur gear, via a shaft 112, and thus rotation of the electric motor can be transmitted to the gear 113.

A bearing 115 co-rotatable with rotation of the gear 113 is provided at the side opposite to the gear 113, and is disposed such that the axis direction of the gear 113 and the axis direction of the bearing 115 are matched to each other.

The material F is supplied between the gear 113 and the bearing 115 to convey the material F in one direction MD along with the rotational direction of the gear 113, to thereby supply the material F to the supply port 110.

The driving section 111 is fixed to and supported by the supply port 110 or a support (not shown) provided on a floor or the like.

The melt spinning apparatus 100 includes a heating section 120 which allows the material F supplied from the supply port 110 to melt.

The heating section 120 is in communication with the supply port 110. The heating section 120 is heated by a heating device (not shown) such as a heater, and by supplying the material F into the heating section 120, a molten liquid of the material F can be provided without application of any kneading force.

The phrase "without application of any kneading force" means no application of any shear force to a material to be molten. In other words, the heating section 120 does not include therein any member or device for applying any shear force to a material, for example, a screw or a stirring blade.

The molten liquid obtained by melting the material F in the heating section 120 is pushed out according to the supply speed of the material F supplied from the supply port 110, and concurrently travelled toward the nozzle 130.

The heating temperature in the heating section 120 can be appropriately changed depending on physical properties of the material F supplied, and is preferably a temperature equal to or more than the solidification temperature of the material.

For example, in a case where PP (melting point: 160° C.) is included as the material, the heating temperature in the heating section 120 is preferably 180° C. or more, even more preferably 190° C. or more, in view of certainly melting the material to obtain a uniform molten liquid to thereby facilitate feeding of the molten liquid.

The heating temperature in the heating section 120 in the case of use of PP is preferably 280° C. or less, even more preferably 260° C. or less, in view of prevention of thermal degradation of the material.

For example, in a case where PLA (melting point: 160° C.) is included as the material, the heating temperature in the heating section 120 is preferably 170° C. or more, even more preferably 180° C. or more, in view of certainly melting the material to obtain a uniform molten liquid to thereby facilitate feeding of the molten liquid.

The heating temperature in the heating section 120 in the case of inclusion of PLA is preferably 280° C. or less, even more preferably 260° C. or less, in view of prevention of thermal degradation of the material.

The melt spinning apparatus 100 includes a hollow nozzle 130 which is in direct communication with the heating section 120 and discharges the molten material, and a gas flow spraying section 140 which allows the material molten discharged from the nozzle 130 to be conveyed by gas flow.

Figure 6:
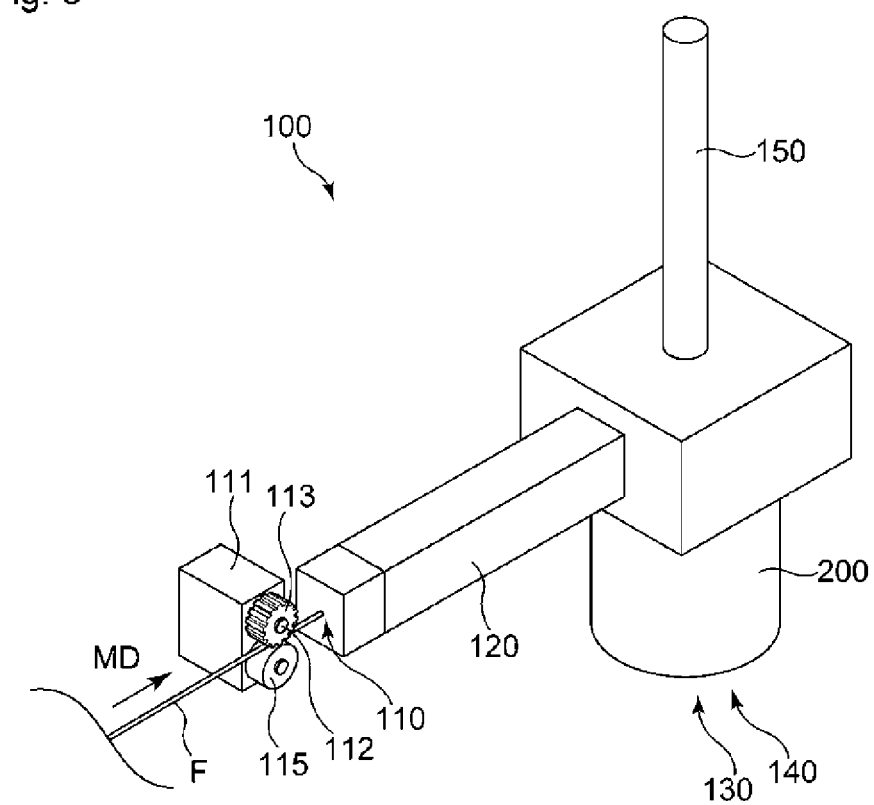
FIG. 6 is a perspective schematic view illustrating one embodiment of the melt spinning apparatus of the present invention.

The melt spinning apparatus 100 illustrated in FIG. 4 and FIG. 6 is in the form of a spinning unit 200 including the nozzle 130 and the gas flow spraying section 140. The spinning unit 200 is also preferably provided, on the upper side thereof, with a gas flow generating section 150 which supplies gas flow heated to the gas flow spraying section 140.

FIGS. 7(*a*) and (*b*) each schematically illustrate a cross section of a spinning unit 200 in a melt spinning apparatus 100.

The spinning unit 200 illustrated in FIG. 7(*a*) is suitably used for a melt blowing method among melt spinning methods.

A nozzle 130 illustrated in FIG. 7(*a*) is disposed in a central region of the spinning unit, and is in direct communication with a heating section 120. In other words, all of a supply port 110, the heating section 120, and the nozzle 130 are in direct communication.

The nozzle 130 is configured such that the molten liquid of the material, which is molten in the heating section 120, can be discharged outward from the tip of the nozzle 130 via a resin supply path 131 which is in communication with the heating section 120 and the nozzle 130.

The molten liquid to be discharged from the nozzle 130 is discharged by being pushed out according to the supply speed of the material F supplied from the supply port 110, and thus the amount of the molten liquid discharged can be appropriately adjusted by tailoring the supply speed of the material. In other words, in a case where the supply speed of the material F supplied from the supply port 110 is slowed down, the amount of the molten liquid discharged from the nozzle 130 is decreased, and on the other hand, in a case where the supply speed of the material F supplied from the supply port 110 is increased, the amount of the molten liquid discharged from the nozzle 130 is increased.

A known trapping device (not shown) such as a net conveyor or a trapping screen is provided opposite to the nozzle 130, and thus the molten liquid discharged can be deposited and trapped in the form of a fiber in a solidified state on the trapping device.

As illustrated in FIG. 7(*a*), one or more gas flow spraying sections 140 are disposed outside relative to the nozzle 130 when the spinning unit 200 is viewed from the front.

The gas flow spraying sections 140 are each configured such that gas flow heated can be sprayed toward the tip side from the back-end side of the nozzle 130.

A gas flow generating section 150 which supplies gas flow heated to each of the gas flow spraying sections 140 is connected to each of the gas flow spraying sections 140, and thus the gas flow can be supplied to each of the gas flow spraying sections 140 and 140. The gas flow here used can be, for example, air flow in view of convenience.

On the other hand, the spinning unit 200 illustrated in FIG. 7(*b*) is suitably used for a melt electrospinning method, among melt spinning methods.

The spinning unit 200 illustrated in FIG. 7(*b*) includes a nozzle 130 and a gas flow spraying section 140, as in the spinning unit 200 illustrated in FIG. 7(*a*).

For this embodiment, portions different from those of the above-mentioned embodiment are described below, and the descriptions for the above-mentioned embodiment are also appropriately applied to this embodiment unless otherwise specified.

The spinning unit 200 illustrated in FIG. 7(*b*) includes an electrode 160 which electrically charges the nozzle 130 to generate an electrical field between the electrode and the nozzle 130 to thereby electrically charge the material F.

The electrode 160 in this embodiment is made of a conductive material such as a metal, and is electrically connected to a high-voltage generator 162 which applies a voltage to the electrode 160. The nozzle 130 is also made of a conductive material such as a metal.

The electrode 160 can be appropriately modified in terms of the shape and arrangement thereof as long as an electrical field can be formed between the electrode 160 and the nozzle 130.

In the embodiment illustrated in FIG. 7(*b*), the electrode 160 has a substantially bowl shape which is placed so as to surround the nozzle 130, and the nozzle 130 and the electrode 160 are apart from each other. The nozzle-facing surface of the electrode 160 is a concave curved surface.

For the sake of description, such a nozzle-facing surface of the electrode 160 is also referred to as a "concave curved surface 161" hereinafter.

The electrode 160 has an opening end on the tip side of the nozzle 130, and the planar shape of the opening end is a circular shape such as a true circular shape or an elliptic shape.

The electrode 160 further includes a high-voltage generator 162, and the electrode 160 and the high-voltage generator 162 are connected to allow the generator to apply a positive or negative voltage.

Figures 7A, 7B:
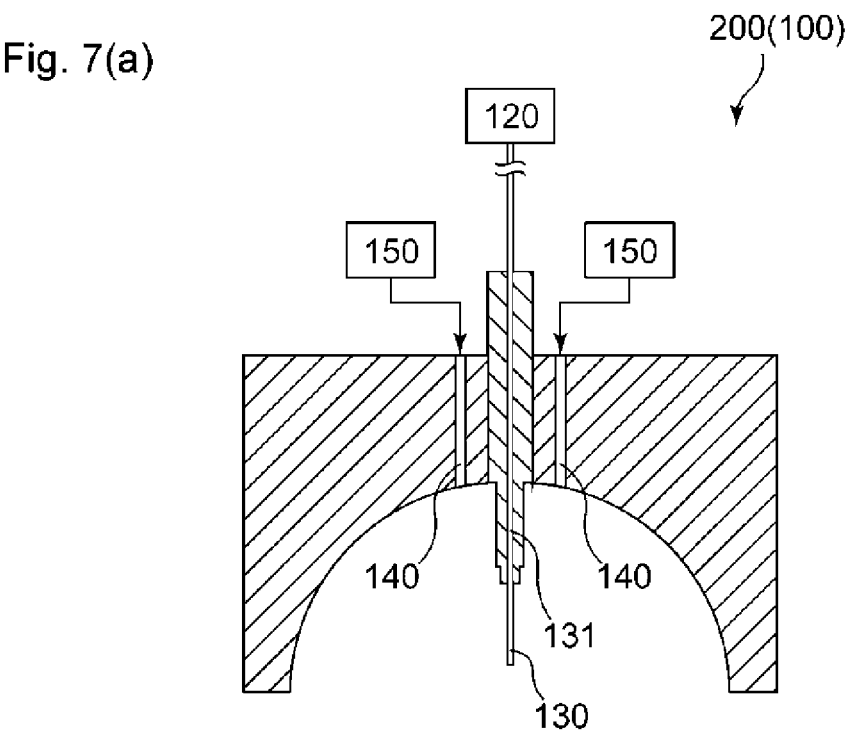
FIGS. 7($a$) and ($b$) are each a cross-sectional schematic view illustrating one embodiment of a spinning unit in the melt spinning apparatus of the present invention.

As illustrated in FIG. 7(b), the spinning unit 200 also preferably includes an electrically insulating wall section 165 disposed at least on the concave curved surface 161, which is the nozzle-facing surface of the electrode 160. Thus, electric discharge between the nozzle 130 and the electrode 160 can be prevented to stably perform spinning of a fiber.

The wall section 165 is preferably made of, for example, an insulating material such as a ceramic material or a resin-based material.

The constituent material of the gas flow spraying section 140 is not particularly limited and is preferably selected in consideration of electric chargeability of the nozzle 130, and, for example, the same material as that of the wall section 165 can be used.

The spinning unit 200 illustrated in FIG. 6 and FIG. 7(b) may have a trapping device (not shown) in which a trapping electrode made of a conductive material such as a metal is placed opposite to the nozzle 130.

Preferably, the trapping electrode is grounded. Alternatively, the trapping electrode is connected to the high-voltage generator so that a voltage is applied to the trapping electrode. In this case, a voltage different from the voltage applied to the nozzle 130 is also preferably applied to the trapping electrode.

The trapping device may have a conveying device, such as a belt conveyor, disposed between the nozzle 130 and the trapping electrode. The fiber trapped after spinning can be conveyed to the downstream step by the conveying device.

Hereinafter, a method for producing fiber by a melt spinning method using the melt spinning apparatus 100 is described.

In production of a fiber, the melt spinning resin composition being a filament having a melt viscosity of 250 Pa·s or less at 200° C. and a shear rate of $0.1\ s^{-1}$ and having a tensile strength of 10 MPa or more (namely, "filament F") can be preferably used as the material F.

In a case where a melt blowing method is used as a melt spinning method, first, the filament F is supplied from the supply port 110 and heated in the heating section 120 to provide a molten liquid. This molten liquid is travelled to be pushed out toward the nozzle 130 according to the speed of the filament F supplied from the supply port 110.

Next, the filament F molten, namely, a molten liquid of the filament F is discharged from the nozzle 130 to spin, while gas flow heated is supplied from the gas flow generating section 150 to the gas flow spraying section 140 and is sprayed from the gas flow spraying section 140. Thus, the molten liquid can be conveyed by the gas flow heated and concurrently drawn to spin an ultrafine fiber.

In a case where a melt electrospinning method is used as a melt spinning method, first, the filament F is supplied from the supply port 110 and is heated in the heating section 120 to provide a molten liquid, as in the melt blowing method. This molten liquid is travelled to be pushed out toward the nozzle 130 according to the speed of the filament F supplied from the supply port 110.

Next, while an electrical field is formed between the nozzle 130 and the electrode 160, the molten liquid of the filament F is discharged from the nozzle 130 into the electrical field to spin. The molten liquid of the filament F here is in the state where it is electrically charged to a positive polarity or a negative polarity depending on the polarity of the electrical field. For example, the electrical field can be generated between nozzle 130 and the electrode 160 by grounding the nozzle 130 and also applying the voltage generated from the high-voltage generator 162 to the electrode 160, with reference to the spinning unit 200 illustrated in FIG. 6 and FIG. 7(b) as an example.

A voltage is applied to the electrode 160 so that the absolute value of the difference in potential between the nozzle 130 and the electrode 160 is preferably 5 kV or more, preferably 10 kV or more, in view of easily forming a smaller diameter fiber.

A voltage is applied to the electrode 160 so that the absolute value of the difference in potential between the nozzle 130 and the electrode 160 is preferably 100 kV or less, even more preferably 80 kV or less, in view of preventing unintended electric discharge and current leakage to prevent malfunction of the producing apparatus 10.

The molten liquid discharged is three-dimensionally drawn to become fine by electric repulsion generated therein, and at the same time, cooling and solidification of the resin progress. Thus, a small diameter fiber is formed.

In particular, the melt spinning apparatus 100 even more preferably includes both the gas flow spraying section 140 and the electrode 160 as illustrated in FIG. 7(b), in view of allowing the molten liquid to become finer to form a smaller diameter fiber. More specifically, the following manner is even more preferable: gas flow heated is supplied from the gas flow generating section 150 to the gas flow spraying section 140 to be sprayed from the gas flow spraying section 140, and at the same time, a voltage is applied to the electrode 160 to form an electrical field; and under such conditions, the molten liquid of the filament F is discharged from the nozzle 130 to be spun while the molten liquid is electrically charged in the electrical field.

For both a melt blowing method and a melt electrospinning method for producing a fiber, the temperature of the gas flow sprayed from the gas flow spraying section 140 is preferably 100° C. or more, even more preferably 200° C. or more, in view of easily forming a smaller diameter fiber, though the preferable temperature depends on the constituent component of the resin composition.

The temperature of the gas flow sprayed from the gas flow spraying section 140 can be appropriately changed depending on the inciting point of the resin used, but is practically 500° C. or less, preferably 450° C. or less. In other words, the gas flow sprayed from the gas flow spraying section 140 is preferably a heated gas.

For the same point of view, the rate of the gas flow sprayed at the discharge port of the gas flow spraying section 140 is preferably 5 L/min or more, even more preferably 10 L/min or more, in view of easily forming a smaller diameter fiber.

The rate of the gas flow sprayed at the discharge port of the gas flow spraying section 140 is preferably 500 L/min or less, even more preferably 400 L/min or less, in view of preventing unintended breaking of a fiber spun.

By contacting with a gas flow having at least one of such a temperature and such a rate, the efficiency in drawing the molten liquid can be enhanced due to the external force of the gas flow contacted. In addition, the spatial temperature around the nozzle can be kept high, and thus cooling and solidification of the molten resin can be delayed to allow the state of the molten liquid drawn to be maintained for a long time. As a result, an ultrafine fiber having a decreased diameter can be efficiently produced.

In producing a fiber particularly by a melt electrospinning method, the following advantage is brought about: by contacting the molten liquid discharged with gas flow to be spun, the efficiency in drawing the molten liquid is enhanced due to not only contact with a heated gas but also electric repulsion generated in the electrically charged molten liquid, and thus an ultrafine fiber having a further decreased diameter can be efficiently produced at a high productivity.

A fiber produced by the above melt spinning method is an ultrafine fiber called nanofiber which has a fiber diameter of 10 μm or less in terms of circle equivalent diameter.

The nanofiber preferably has a fiber diameter of 0.1 lam or more, in view of an enhancement in strength of the nanofiber.

The fiber diameter of the nanofiber is more preferably 5 μm or less, even more preferably 3 tin or less, in view of an increase in the surface area due to a decrease in the fiber diameter and an enhancement in adhesiveness.

In particular, the use of the resin composition for melt spinning in the form of a filament as a material in fiber formation can achieve both much ease of handling and much ease of continuous supply of the filament while also preventing thermal degradation.

<Method for Measuring Median Fiber Diameter>

The fiber diameter can be measured by arbitrarily selecting 200 fibers in a two-dimensional image under scanning electron microscope observation, excluding defects such as a mass of spun fibers, an intersection of fibers, and a polymer droplet, and reading a length of a line perpendicular to the longitudinal direction of each of the fibers, as each fiber diameter. The median fiber diameter is determined from the distribution of the found fiber diameters, and is used as the fiber diameter in the present invention.

A nanofiber or a deposit thereof produced by an electrospinning method with the melt spinning apparatus 100 can be collected to give a formed product made of such a nanofiber, which can be used for various applications.

Examples of the formed product include a sheet, a cotton-like substance, a filamentous substance, and a porous film.

The formed product may be laminated on another sheet, or, for example, various liquids, fine particles, and/or fibers may be incorporated into the formed product before use.

For example, the fiber sheet is suitably used as a sheet which is to be attached onto the human skin, tooth, gum or hair, the non-human mammalian skin, tooth or gum, or a plant surface such as a branch or a leaf, for medical use or for non-medical use such as cosmetic use and decorative use.

Such a fiber sheet is suitably used also as, for example, a high-efficiency filter with high dust collecting properties and low pressure loss, a battery separator usable at a high current density, and a cell culturing substrate having a high hole structure. A cotton-like substance made of the fiber is suitably used as, for example, an acoustic insulating material or a heat insulating material.

The present invention has been described above based on preferred embodiments, but the present invention is not limited to these embodiments.

For example, in the above-mentioned embodiment, the electrode 160 is provided with the high-voltage generator 162 connected thereto for applying a voltage to the electrode 160, but the electrode 160 is not particularly limited to such a configuration as long as an electrical field for electrically charging the material F can be formed.

Specifically, the nozzle 130, the electrode 160, and the high-voltage generator 162 which is connected to the nozzle 130 to apply a voltage to the nozzle 130 may be provided. Alternatively, the nozzle 130 and a trapping device including a trapping electrode may be provided, wherein an electrical field can be generated by applying a voltage to at least one of the nozzle 130 and the trapping electrode. Also in these cases, an electrical field for electrically charging the material F can be formed.

EXAMPLES

Hereinafter, the present invention is more specifically described by way of Examples. However, the scope of the present invention is not limited to such Examples. In Tables, the mark "-" indicates no material contained or no evaluation performed.

Examples 1-1 to 1-6 and Comparative Examples 1-1 to 1-3

Examples and Comparative Examples here were made for examining a relationship between the formulation of a resin composition being a filament, and flexibility and strength of the filament, in production of the resin composition. These were also made for examining the capability to form a fiber from the filament.

[1. Production of Filament]

The filament producing apparatus 10 was used to melt knead a resin composition including PP or PLA, a charge control agent, an elastomer, and a modifier at a ratio shown in Table 1 below, and the molten liquid of the resin was extruded from the discharge port 24 to provide a formed material S. The diameter of the discharge port 24 was 5 mm, the distance D1 was 10 mm, the speed of the molten liquid extruded from the discharge port 24, V1, was 3 to 4.2 m/min, and the speed of the formed material S conveyed, V2, was 1 to 2 m/min. In Example 1-1, a filament producing apparatus 10 having the structure illustrated in FIG. 3(a) was used, and thus, the formed material S was conveyed and concurrently immersed in water in a liquid tank to be cooled with water, to thereby produce a resin composition being a filament.

In Examples other than Example 1-1, and Comparative Examples 1-1 to Comparative Example 1-3, a producing apparatus 10 having the structure as illustrated in FIG. 2 but including no cooling gas supply section 45 was used in which the conveying section 30 was in the form of a belt conveyor, and the formed material S was conveyed and concurrently naturally cooled with air, to thereby produce a resin composition being a filament. In Comparative Example 1-3, a PP filament (manufactured by Uniplus Shiga Co., Ltd., MFR: 20 g/10 min (conditions: 230° C., 2.16 kg)) for a 3D printer was used.

Materials used in the production of a filament were as follows.

Polypropylene: polypropylene (manufactured by PolyMirae Company Ltd., MF650Y, melting point 160° C., MFR: 1800 g/10 min (conditions: 230° C., 2.16 kg), weight-average molecular weight: 79 000 g/mol.

Polylactic acid A: obtained by placing and hydrolyzing item number 4032D (manufactured by NatureWorks LLC) in an environment at 85° C. and 95% RH for 18 hours to adjust the weight-average molecular weight to 42 000 g/mol.

Polylactic acid B: obtained by placing and hydrolyzing item number 4032D (manufactured by NatureWorks LLC) in an environment at 85° C. and 95% RH for 12 hours to adjust the weight-average molecular weight to 81 000 g/mol.

Polylactic acid C: item number 6252D manufactured by NatureWorks LLC (weight-average molecular weight: 10 0000 g/mol), MFR: 70 to 85 g/10 min (conditions: 210° C., 2.16 kg).

Polylactic acid D: item number 4032D manufactured by NatureWorks LLC (weight-average molecular weight: 200 000 g/mol), MFR: 7 g/10 min (conditions: 210° C., 2.16 kg).

Charge control agent: sodium. N-stearoyl methyl taurate (trade name: Nikkol SMT, manufactured by Nikko Chemicals Co., Ltd.)

Elastomer: polyolefinic elastomer (Tafmer PN-20300, manufactured by Mitsui Chemicals, Inc.)

Modifier: low crystalline polyolefin (L-MODU S400, manufactured by Idemitsu Kosan Co., Ltd.)

[2. Production of Fiber]

Figure 5B:
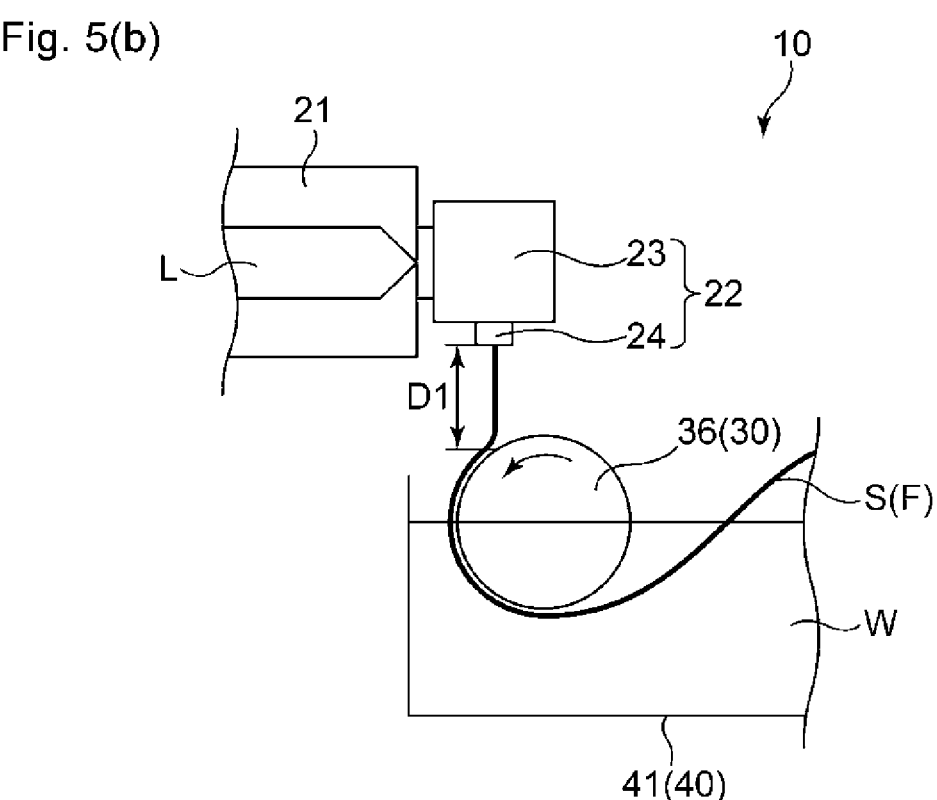

Each of the resin compositions being the filaments obtained in Examples and Comparative Examples was supplied to the melt spinning apparatus 100 illustrated in FIG. 5, to produce a fiber. In each of Examples and Comparative Examples, the spinning unit 200 illustrated in FIG. 6 was used to produce a fiber by a melt electrospinning method. Conditions for producing are shown below.

[Conditions of Producing Fiber]

Production environment: 27° C., 50% RH

Heating temperature in heating section 120: 250° C.

Speed of molten liquid discharged from nozzle 130: 2 to 6 g/min

Voltage applied to nozzle 130 (made of stainless steel): 0 kV (grounded to the earth.)

Voltage applied to electrode 160 (made of stainless steel): –20 kV

Inner diameter at tip of nozzle 130: 0.4 mm

Distance between tip of nozzle 130 and trapping device: 600 mm

Temperature of air flow spayed from gas flow spraying section 140: 450° C.

Rate of air flow spayed from gas flow spraying section 140: 150 L/min

[Feasibility of Production of Filament]

The feasibility of production of a filament in each of Examples and Comparative Examples was evaluated according to the following evaluation criteria. The results are shown in Table 1.

G: possible to produce a filament having a cross-sectional diameter of 1 mm or more, as measured by the above-mentioned method for measuring a cross-sectional diameter of a filament.

P: impossible to produce a filament stably because the cross-sectional diameter of the filament was less than 1 mm, as measured by the above-mentioned method for measuring a cross-sectional diameter of a filament, or difficult to collect and use the filament produced because the filament easily bent and had a unstable shape.

[Melt Viscosity and Tensile Strength of Filament]

Measurements of the melt viscosity and the tensile strength were made according to the above-mentioned methods. The results are shown in Table 1.

[Cross-Sectional Average Diameter of Filament and Standard Deviation of Cross-Sectional Diameter of Filament]

The cross-sectional average diameter of a filament was measured by the above-mentioned method for measuring a cross-sectional average diameter of a filament, and the standard deviation of the cross-sectional diameter of the filament was also determined. A smaller standard deviation means that the cross-sectional diameter in the single filament is more uniform. The results are shown in Table 1.

[Determination of Circularity of Cross Section of Filament]

The circularity of the cross section of the filament was determined for evaluation of stability in production of a filament. The circularity of the cross section of the filament was determined in the following manner: the longer diameter and the shorter diameter were measured at each measurement point in the same manner as in the above-mentioned measurement of the cross-sectional average diameter; the ratio, shorter diameter/longer diameter, was calculated at each measurement point; and the arithmetic average value of the ratios, shorter diameter/longer diameter, at all measurement points was obtained, which was used as the circularity.

The circularity in this determination method is within a range of more than 0 (zero) and 1 or less. The circularity is 1 when the cross-sectional shape of the filament is a true circle, and, as the circularity is closer to 1, the cross-sectional shape is closer to a true circle. The shape of the discharge port 24 in the filament producing apparatus 10 used in Examples was a circular shape having a circularity close to 1. Thus, a circularity close to 1 means that the change from the cross-sectional shape immediately after extrusion of a molten liquid of a resin from the discharge port 24 to the cross-sectional shape of a filament after cooling and solidification is small, and that a filament can thus be stably produced. The results are shown in Table 1.

[Ratio of Length of Filament to Cross-Sectional Average Diameter of Filament]

Measurements were made according to the above-mentioned methods, and the ratio was calculated by dividing the length of the filament by the cross-sectional average diameter of the filament. The results are shown in Table 1.

[Evaluation of Bending of Filament]

Each of the filaments produced in Examples and Comparative Examples was subjected to evaluation of bending by the following method. One end of a linear filament having a length of 15 cm was secured by the human hand, and the filament was bent at the middle thereof as a bending axis such that the other end of the filament was brought into contact with the one end secured. The angle of the filament at breaking was measured, and evaluation was made on the angle according to the following criteria. The results are shown in Table 1. The flexibility is higher and handling in storage and spinning is easier, in the order of C<B<A.

<Evaluation Criteria>

A: both ends of the filament can be easily contacted without any breaking even when bending with travelling the other end of the filament by 180 degrees, and flexibility is thus excellent.

B: breaking of the filament occurs when the other end of the filament travels by 120 degrees or more and less than 180 degrees, and flexibility is thus slightly inferior.

C: breaking of the filament occurs when the other end of the filament travels by less than 120 degrees, and flexibility is thus poor.

[Breaking Strain of Filament]

Each of the filaments produced in Examples and Comparative Examples was subjected to the above-mentioned measurement of the breaking strain with a tensile tester (AG-X plus manufactured by Shimadzu Corporation), and the breaking strain was calculated by the above-mentioned calculation method. The results are shown in Table 1.

[Measurement of Median Fiber Diameter]

The diameter of each of the fibers spun in respective conditions for production in Examples and Comparative Examples was measured by the above-mentioned method. A case where it was impossible to discharge any molten liquid from the spinning unit 200 and thus impossible to produce any fiber was indicated as "Unspinable". The results are shown in Table 1.

The tensile strength and the breaking strain of each of the filaments produced in respective conditions in Example 1-5 and Example 1-6 were the value at the overload because the

TABLE 1

| | | Example 1-1 | Example 1-2 | Example 1-3 | Example 1-4 | Example 1-5 | Example 1-6 | Comp. Example 1-1 | Comp. Example 1-2 | Comp. Example 1-3 |
|---|---|---|---|---|---|---|---|---|---|---|
| Material of resin composition [% by mass] | Polypropylene | 100 | 90 | 90 | — | — | — | 95 | — | 100*1 |
| | Charge control agent | — | 5 | — | — | — | — | 5 | — | — |
| | Elastomer | — | 5 | — | — | — | — | — | — | — |
| | Modifier | — | — | 10 | — | — | — | — | — | — |
| | Polylactic acid A | — | — | — | 100 | — | — | — | — | — |
| | Polylactic acid B | — | — | — | — | 100 | — | — | — | — |
| | Polylactic acid C | — | — | — | — | — | 100 | — | — | — |
| | Polylactic acid D | — | — | — | — | — | — | — | 100 | — |
| Temperature of molten liquid of resin composition [° C.] | | 200 | 200 | 200 | 200 | 200 | 200 | 200 | 200 | 200 |
| Method for cooling formed material | | Water cooling | Air cooling | Air cooling | Air cooling | Air cooling | Air cooling | Air cooling | Air cooling | Air cooling |
| Cooling temperature of formed material [° C.] | | 21 | 23 | 23 | 23 | 23 | 23 | 23 | 23 | 23 |
| Temperature of molten liquid/ cooling temperature (ratio in terms of absolute temperature) | | 1.61 | 1.60 | 1.60 | 1.60 | 1.60 | 1.60 | 1.60 | 1.60 | 1.60 |
| Resin composition | Feasibility of production of filament | G | G | G | G | G | G | G | P | G |
| | Melt viscosity [Pa · s] | 8.8 | 15.2 | 8.4 | 13.9 | 69.7 | 200.4 | 9.3 | 2579.6 | — |
| | Tensile strength [MPa] | 24.3 | 18.3 | 10.5 | 18.3 | 31.2≤ | 31.9≤ | 8.5 | — | 12.7 |
| | Cross-sectional average diameter [mm] | 1.65 | 1.59 | 1.60 | 1.73 | 1.78 | 2.02 | 1.72 | — | 1.73 |
| | Standard deviation of cross-sectional diameter | 0.21 | 0.11 | 0.10 | 0.05 | 0.05 | 0.08 | 0.07 | — | 0.02 |
| | Filament length [m] | 30 | 30 | 30 | 20 | 20 | 20 | 10 | — | 10 |
| | Ratio of length to cross-sectional average diameter of filament | 18182 | 18868 | 18750 | 11561 | 11236 | 9901 | 5814 | — | 5780 |
| | Circularity of cross section of filament | 0.79 | 0.88 | 0.90 | 0.96 | 0.98 | 0.96 | 0.94 | — | 0.98 |
| | Evaluation of bending of filament | A | B | B | B | A | A | C | — | A |
| | Strain at breaking [%] | 4.3 | 2.3 | 1.7 | 2.2 | 6.9≤ (no breaking during test) | 1.9≤ (no breaking during test) | 1.9 | — | 17.4≤ (no breaking during test) |
| Fiber | Median fiber diameter [μm] | 1.1 | 2.5 | 0.6 | 2.0 | 3.9 | 7.2 | 0.6 | Unspinable | Unspiriable |

*1A commercially available product for 3D printer was used.

As shown in Table 1, in the conditions in each Example, filaments were obtained which had an enough length for continuous supply and also resulted in high levels in the evaluation of bending and the tensile strength even when using different resin materials, as compared with in the conditions in Comparative Examples. Therefore, the filaments in Examples enabled space-saving by winding around a shaft and/or bending, and in addition, had much ease of handling and continuous supply, which enabled pushing to the melt spinning apparatus with a gear. The fibers produced from the respective filaments obtained in Examples were ultrafine, and it was found that efficiency in producing fiber was also high.

In particular, it was found from Examples 1-4 to 1-6 that, even in a case where PLA, which was difficult to apply to a melt spinning method in the conventional art, was used, degradation of such a material due to heat, hydrolysis, or the like hardly occurred, and that it was possible to produce a fiber at a high production efficiency.

PLA used in Comparative Example 1-2 had a higher melt viscosity than that of the resin composition used in each Example, as shown in Table 1, and thus was difficult to discharge by the producing apparatus 10 to fail to produce a filament.

load cell used in the tensile test had a capacity of 100 N, and thus these filaments were found to have a high tensile strength and a high breaking strain. The tensile strength in Example 1-5 and Example 1-6 was 100 MPa or less.

On the other hand, the filament for a 3D printer in Comparative Example 1-3 exhibited the maximum test force in the tensile test; however, the filament was continuously drawn without breaking and it was thus impossible to measure the breaking strain.

Examples 2-1 to 2-13 and Comparative Examples 2-1 to 2-2

Examples and Comparative Examples here were made for examining the influence of the distance between the discharge port 24 and the conveying section 30, D1, on filament production, in producing of a resin composition being a filament.

A producing apparatus 10 having the structure as illustrated in FIG. 2 but including no cooling gas supply section 45 was used. Polypropylene (the same as that used in Example 1-1) as a thermoplastic resin and low crystalline polyolefin (L-MODU S400 manufactured by Idemitsu Kosan Co Ltd.) as a modifier were used as materials at a mass ratio shown in Table 2, and melt kneaded to extrude a molten liquid of the resin from the discharge port 24, to thereby providing a formed material S. The diameter of the discharge port was 5 mm, and the distance D1; the speed of the molten liquid extruded from the discharge port 24, V1; the speed of the formed material S conveyed, V2; and the ratio V2/V1 were as shown in Table 2 below. The conveying section 30 was in the form of a belt conveyor, and the formed material S was conveyed and concurrently naturally cooled with air, to thereby produce a resin composition being each filament in Examples and Comparative Examples.

Table 2 also shows the details of conditions for production in Example 1-1.

[Cross-Sectional Average Diameter of Filament, Standard Deviation of Cross-Sectional Diameter of Filament, and Circularity of Cross Section]

Determination was made as in [Cross-sectional average diameter of filament, and standard deviation of cross-sectional diameter of the filament] and [Determination of circularity of cross section of filament] described above. The results are shown in Table 2.

[Ratio of Length of Filament to Cross-Sectional Average Diameter of Filament]

The average cross-sectional diameter and length of the filament were measured by the above-mentioned methods, and the ratio was calculated by dividing the length of the filament by the cross-sectional average diameter of the filament. The results are shown in Table 2.

[Feasibility of Production of Filament]

Evaluation was made according to the above-mentioned evaluation criteria. The results are shown in Table 2.

TABLE 2

| | | Example 1-1 | Example 2-1 | Example 2-2 | Example 2-3 | Example 2-4 | Example 2-5 | Example 2-6 | Example 2-7 | Example 2-8 |
|---|---|---|---|---|---|---|---|---|---|---|
| Composition of material | Polypropylene [% by mass] | | | | | 100 | | | | |
| | Modifier [% by mess] | | | | | 0 | | | | |
| Conditions of production | Temperature of molten liquid in cylinder [° C.] | 200 | 200 | 200 | 200 | 200 | 200 | 200 | 200 | 200 |
| | Temperature of molten liquid at discharge base [° C.] | 200 | 200 | 200 | 200 | 200 | 200 | 200 | 200 | 200 |
| | Distance between discharge port and conveying section (D1) [mm] | 10 | 5 | 5 | 5 | 10 | 10 | 10 | 30 | 30 |
| | Diameter of discharge port [mm] | 5 | 5 | 5 | 5 | 5 | 5 | 5 | 5 | 5 |
| | Speed of molten liquid extruded from discharge port (V1) [m/min] | 0.24 | 0.24 | 0.24 | 0.24 | 0.24 | 0.24 | 0.24 | 0.24 | 0.24 |
| | Speed of formed material conveyed (V2) [m/min] | 2.0 | 1.0 | 2.0 | 3.5 | 1.5 | 3.5 | 5.0 | 1.0 | 1.6 |
| | Ratio V2/V1 | 8.3 | 4.2 | 8.3 | 14.6 | 6.3 | 14.6 | 20.8 | 4.2 | 6.7 |
| | Configuration of conveying section | Water tank/roller | Conveyor | Conveyor | Conveyor | Conveyor | Conveyor | Conveyor | Conveyor | Conveyor |
| | Cooling method | Water cooling | Air cooling | Air cooling | Air cooling | Air cooling | Air cooling | Air cooling | Air cooling | Air cooling |
| | Cooling temperature [° C.] | 21 | 23 | 23 | 23 | 23 | 23 | 23 | 23 | 23 |
| | Temperature of molten liquid/ Cooling temperature (ratio in terms of absolute temperature) | 1.61 | 1.60 | 1.60 | 1.60 | 1.60 | 1.60 | 1.60 | 1.60 | 1.60 |
| Resin composition | Cross-sectional average diameter of filament [mm] | 1.65 | 2.50 | 1.57 | 1.26 | 1.92 | 1.28 | 1.05 | 2.33 | 1.91 |
| | Standard deviation of cross-sectional diameter of filament | 0.21 | 0.32 | 0.06 | 0.04 | 0.09 | 0.04 | 0.03 | 0.20 | 0.11 |
| | Filament length [m] | 30 | 20 | 20 | 20 | 20 | 20 | 20 | 20 | 20 |
| | Ratio of length to cross-sectional averge diameter or filament | 18182 | 8000 | 12751 | 15848 | 10417 | 15625 | 19020 | 8573 | 10471 |
| | Circularity of cross section of filament | 0.79 | 0.78 | 0.94 | 0.94 | 0.92 | 0.95 | 0.96 | 0.85 | 0.90 |
| | Feasibility of production of filament | G | G | G | G | G | G | G | G | G |

| | | Example 2-9 | Example 2-10 | Example 2-11 | Example 2-12 | Example 2-13 | Comp. Example 2-1 | Comp Example 2-2 |
|---|---|---|---|---|---|---|---|---|
| Composition of material | Polypropylene [% by mass] | | | 100 | | | 90 | 100 |

TABLE 2-continued

| | | | | | | | | |
|---|---|---|---|---|---|---|---|---|
| Conditions of production | Modifier [% by mess] | | 0 | | | 10 | | 0 |
| | Temperature of molten liquid in cylinder [° C.] | 200 | 200 | 230 | 200 | 200 | 200 | 200 |
| | Temperature of molten liquid at discharge base [° C.] | 200 | 200 | 220 | 200 | 200 | 200 | 200 |
| | Distance between discharge port and conveying section (D1) [mm] | 30 | 50 | 50 | 10 | 10 | 70 | 70 |
| | Diameter of discharge port [mm] | 5 | 5 | 5 | 5 | 5 | 5 | 5 |
| | Speed of molten liquid extruded from discharge port (V1) [m/min] | 0.24 | 0.24 | 0.24 | 0.24 | 0.24 | 0.24 | 0.24 |
| | Speed of formed material conveyed (V2) [m/min] | 3.5 | 2.7 | 3.5 | 1.6 | 1.6 | 5 | 7 |
| | Ratio V2/V1 | 14.6 | 11.3 | 14.6 | 6.7 | 6.7 | 20.8 | 29.2 |
| | Configuration of conveying section | Conveyor | Conveyor | Conveyor | Roller | Conveyor | Conveyor | Conveyor |
| | Cooling method | Air cooling | Air cooling | Air cooling | Water cooling | Air cooling | Air cooling | Air cooling |
| | Cooling temperature [° C.] | 23 | 23 | 23 | 23 | 23 | 23 | 23 |
| | Temperature of molten liquid/ Cooling temperature (ratio in terms of absolute temperature) | 1.60 | 1.60 | 1.60 | 1.60 | 1.60 | 1.60 | 1.60 |
| Resin composition | Cross-sectional average diameter of filament [mm] | 1.27 | 1.45 | 1.27 | 1.65 | 1.60 | — | — |
| | Standard deviation of cross-sectional diameter of filament | 0.04 | 0.05 | 0.03 | 0.21 | 0.10 | — | — |
| | Filament length [m] | 20 | 20 | 20 | 20 | 20 | — | — |
| | Ratio of length to cross-sectional averge diameter or filament | 15748 | 13793 | 15748 | 12121 | 12506 | — | — |
| | Circularity of cross section of filament | 0.96 | 0.97 | 0.97 | 0.79 | 0.90 | — | — |
| | Feasibility of production of filament | G | G | G | G | G | P | P |

It can be seen from Table 2 that a filament having a predetermined diameter is stably and continuously produced when the distance between the discharge port 24 and the conveying section 30, D1, is within the range of 5 mm or more and 50 mm or less.

When at least one of the speed of the molten liquid extruded from the discharge port 24, V1; the speed of the formed material S conveyed, V2; and the ratio V2/V1 is within a suitable range, a filament having a favorable cross-sectional shape with less variation in the cross-sectional diameter can be continuously and stably produced.

Examples 3-1 to 3-2

These Examples were made for examining the capability to form a fiber from a filament.
[Production of Fiber]
A fiber in Example 3-1 was produced by supplying the resin composition being a filament obtained in Example 2-12 to the melt spinning apparatus 100 illustrated in FIG. 6.
A fiber in Example 3-2 was produced by supplying the resin composition being a filament obtained in Example 2-13 to the melt spinning apparatus 100 illustrated in FIG. 6.

In each of Examples, the fiber was produced by a melt electrospinning method using the spinning unit 200 illustrated in FIG. 6. Conditions for production were the same as conditions in Example 1-1.
[Measurement of Median Fiber Diameter]
The diameter of each of the fibers spun in respective conditions for production in Examples 3-1 and 3-2 was measured by the above-mentioned method. The results are shown in Table 3.

TABLE 3

| | Example 3-1 | Example 3-2 |
|---|---|---|
| Filament used | Example 2-12 | Example 2-13 |
| Median diameter of fiber produced [μm] | 1.1 | 0.6 |

It was found from Table 3 that a fiber produced from the filament obtained in each Example was ultrafine and was produced with high efficiency.

INDUSTRIAL APPLICABILITY

According to the present invention, a resin composition for melt spinning is provided which is a filament having both much ease of handling and much ease of continuous supply.

The invention claimed is:

1. A method for producing a fiber using a melt spinning apparatus, the method comprising feeding a filament comprising a thermoplastic resin composition to a heating device in a feed direction;

heating the filament using the heating device to produce a molten filament comprising the thermoplastic resin composition in a molten state; and providing a force in a spinning direction to the molten filament to produce the fiber; and collecting the fiber, wherein the thermoplastic resin composition has a melt viscosity of 250 Pa·s or less at 200° C., a shear rate of 0.1 s$^{-1}$ or more, and a tensile strength of 10 MPa or more, the method produces a continuous fiber while the feeding is performed, the fiber has a mean fiber diameter of 0.1 to 10 μm, and the force is provided by at least one selected from the group consisting of blowing gas and electric repulsion of the molten filament, the electric repulsion generated by applying a voltage to an electrode.

2. The method of claim 1, wherein the feeding is performed from a filament roll comprising the filament in a wound state.

3. The method of claim 1, wherein the heating is performed without applying a kneading force to the filament.

4. The method of claim 1, wherein the filament has a cross-sectional average diameter in a direction perpendicular to a length direction thereof of 1 mm or more and 30 mm or less.

5. The method of claim 1, wherein the thermoplastic resin composition includes a thermoplastic resin at an amount of 95 parts by mass or more based on 100 parts by mass of the resin composition.

6. The method of claim 1, wherein the thermoplastic resin composition comprises a polylactic acid-based resin.

7. The method of claim 1, wherein the thermoplastic resin composition comprises at least one selected from the group consisting of a polypropylene resin having a weight-average molecular weight of 1,000 g/mol to 150,000 g/mol and a polylactic acid-based resin having a weight-average molecular weight of 150,000 g/mol or less.

8. The method of claim 1, wherein the resin comprises a thermoplastic resin, and the thermoplastic resin comprises a polylactic acid-based resin having a weight-average molecular weight of 100,000 g/mol or less.

9. The method of claim 1, further comprising forming the filament by extruding a molten liquid of the resin composition into a formed material;

conveying the formed material to a cooler; and cooling the formed material to produce the filament.

10. The method of claim 9, wherein the cooling is performed using at least one of air cooling, a cooling roller, a gas tank, and a liquid tank.

11. The method of claim 9, wherein a ratio of a speed of the formed material conveyed (V2) to a speed of the molten liquid extruded (V1), V2/V1, is 1 or more and 50 or less.

12. The method of claim 11, wherein the speed of the formed material conveyed, V2, is 0.2 m/min or more and 200 m/min or less.

13. A melt spinning system, comprising a supply port to which a filament is supplied in a feed direction;

a heating section connected to the supply port and configured to receive the filament from the supply port and melt the filament without application of any kneading force;

a nozzle connected to the heating section and configured to receive a molten filament from the heating section and provide a force in a spinning direction to the molten filament to produce a fiber; and at least one selected from the group consisting of a gas flow spraying section configured to provide a gas flow in a spinning direction, the gas flow configured to provide the force to form the molten filament into the fiber, and an electric charging device including an electrode configured to create an electric field between the electrode and the nozzle and to electrically charge the molten filament such that an electric force is supplied to the molten filament to form the molten filament into the fiber, wherein the filament is supplied from the supply port, and concurrently the molten filament is discharged from the nozzle into an electrical field to be spun, in a state where the electrical field is formed by the electrical charging device, wherein the filament comprises a thermoplastic resin composition having a melt viscosity of 250 Pa·s or less at 200° C., a shear rate of 0.1 s$^{-1}$ or more, and a tensile strength of 10 MPa or more, the heating section is configured such that and the filament is supplied such that the filament is substantially molten only when the filament passes from the heating section to the nozzle, the force is supplied such that the molten filament is formed into the fiber, and the fiber has a mean fiber diameter of 0.1 to 10 μm.

14. The system of claim 13, further comprising a filament producing apparatus; comprising an extruding section which extrudes a molten thermoplastic resin composition as a formed material;

a conveying section which conveys the formed material; and a cooling section configured to cool the formed material to produce the filament, wherein a distance between the extruding section and the conveying section is 1 mm or more and 50 mm or less, and the cooling is performed using at least one of air cooling, a cooling roller, a gas tank, and a liquid tank.

15. The method of claim 1, wherein the thermoplastic resin has a tensile strength of 10 to 150 MPa.

16. The method of claim 5, wherein the thermoplastic resin composition further comprises at least one additive selected from the group consisting of an elastomer, a plasticizer, a modifier, a decomposition inhibitor, and a charge control agent.

17. The method of claim 1, wherein the force is provided by electric repulsion of the molten filament, and the voltage applied to the electrode is 5 kV to 100 kV between the electrode and the heating device.

18. The method of claim 1, wherein the force is provided by blowing gas, the gas having a temperature of 100 to 500° C.

19. The system of claim 13, comprising the gas flow spraying section configured to provide a gas flow in a spinning direction, and further comprising a gas heater configured to heat the gas to a temperature of 100 to 500° C.

20. The system of claim 13, comprising the electric charging device including an electrode configured to create an electric field between the electrode and the nozzle and to electrically charge the molten filament such that an electric force is supplied to the molten filament to form the molten filament into the fiber, wherein the electric field is created by applying a voltage of 5 kV to 100 kV between the nozzle and the electrode.

\* \* \* \* \*